United States Patent [19]

Aharoni

[11] Patent Number: 4,767,839
[45] Date of Patent: Aug. 30, 1988

[54] ALTERNATING ALIPHATIC-AROMATIC POLY(ESTERAMIDE)

[75] Inventor: Shaul M. Aharoni, Morris Plains, N.J.

[73] Assignee: Allied-Signal Inc., Morris Township, Morris County, N.J.

[21] Appl. No.: 70,273

[22] Filed: Jul. 6, 1987

[51] Int. Cl.$^4$ .................. C08G 63/44; C08G 69/44
[52] U.S. Cl. .................................. 528/184; 528/183; 528/288; 528/292
[58] Field of Search ............... 528/288, 292, 183, 184

[56] References Cited

U.S. PATENT DOCUMENTS

| | | | |
|---|---|---|---|
| 3,926,923 | 12/1975 | Preston | 528/184 |
| 4,182,842 | 1/1980 | Jackson et al. | 528/292 |
| 4,272,625 | 6/1981 | McIntyre et al. | 528/183 |
| 4,387,210 | 6/1983 | Katoh et al. | 528/179 |
| 4,393,192 | 7/1983 | Curatolo et al. | 528/292 |
| 4,614,815 | 9/1986 | Cognigni et al. | 560/88 |
| 4,681,928 | 7/1987 | Berger et al. | 528/353 |

OTHER PUBLICATIONS

Varshney, JMS-REV. Macromol, Chem Phys., C26(4), 551–659 (1986).
Yamazaki et al., *J. Polymer Sc. Polym. Chem Ed.*, 13, 1373 (1975).
Strzelecki et al., *Europ. Polymer J.*, 16, 299 (1980).
Bartulin et al., *Polymer Bull.*, 15, 405 (1986).
Morgan, *Condensation Polymers: By Interfacial and Solution Methods*, Interscience, New York, 1965, pp. 6–7.
Billmeyer, *Textbook of Polymer Science*, Interscience, New York, 1962, p. 251.
Flory, *Principles of Polymer Chemistry*, Cornell University Press, Ithaca, New York, 1953, pp. 87–91.
Laakso et al., *J. Am. Chem. Soc.*, 82, 3640 (1966).
Manzini et al., *Europ. Polymer J.*, 1973, 9, pp. 941–951.

*Primary Examiner*—Lucille M. Phynes
*Attorney, Agent, or Firm*—Jay P. Friedenson; Harold N. Wells

[57] ABSTRACT

Poly(esteramide) having thermotropic polymorphic properties is characterized by the repeating structure

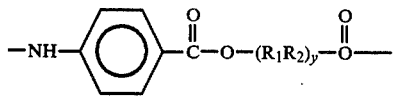

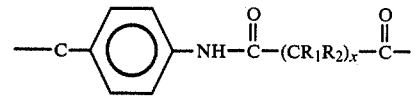

where:
x = integers from 1 to 14
Y = integers from 3 to 9
$R_1$, $R_2$ = H when x+y is an odd integer, properties usually associated with liquid crystal polymers are seen, while when x+y is an even integer birefringence above a major endotherm is observed but the spontaneous flow property usually seen with liquid crystal polymers is absent.

10 Claims, 20 Drawing Sheets

ALTERNATING ALIPHATIC-AROMATIC POLY(ESTERAMIDE)

FIELD OF THE INVENTION

The invention relates generally to poly(esteramide) and more particularly to certain polymers which have thermotropic polymorphic properties, that is they exhibit more than one ordered form upon heating and are related to what are loosely called liquid crystal polymers.

BACKGROUND OF THE INVENTION

Although polymers comprising both esters and amides have been known for some time, they were thought to have very high melting points and not to exhibit the low temperature flow properties characteristic of known thermotropic polyesters which make them melt processable. For example, see U.S. Pat. No. 3,926,923 in which earlier work by Laakso et al. was discussed and the high melting point of their polymers was noted. The polymers of the patent have a repeating unit which contains three aromatic rings and one $C_2$-$C_8$ alkylene group. There is no mention of the potential for exhibiting thermotropic polymorphic properties.

In U.S. Pat. No. 4,272,625 poly(esteramides) are disclosed which do exhibit thermotropic properties. This was accomplished by forming polymers having a repeating unit which includes residues of p-aminophenol and/or p-N-methylaminophenol and residues of carboxylic acids and which is characterized as having " . . . a balance of linear difunctional residues and dissymmetric difunctional residues . . . ". It is stated that "The linear difunctional residues contribute the anisotropic melt-forming property of the poly(esteramide) and the dissymmetric difunctional residues contribute the ability of the poly(esteramide) to melt below its decomposition temperature." In disclosing specific compounds found useful in making such polymers, the patentees clearly indicate that only aromatic residues are useful but that not all aromatic compounds can be used. Thus, one skilled in the art would not expect that non-aromatic residues could form thermotropic polymers based on the teaching of the U.S. Pat. No. 4,272,625.

Varshney in *JMS-Rev. Macromol. Chem. Phys.*, C26(4), 551-659 (1986) makes reference to the patentees of U.S. Pat. No. 4,272,625 and states that "Incorporation of the amide group into the main chain, which increases interchain bonding, tends to increase crystalline phase stability and elevate melting points, thus preventing the observation of a liquid crystalline phase unless the symmetry of the system is reduced." An example of an unsymmetrical repeating unit is given which includes three aromatic rings and an alkylene group containing 2 to 12 carbon atoms. There is no indication that polymers containing symmetrical repeating units in which single aromatic rings are regularly alternated with alkylene groups would have thermotropic properties. The present invention discloses such polymers.

U.S. Pat. No. 4,182,842 discloses a poly(esteramide) having improved physical properties which are prepared from a polyester and a p-acyl aminobenzoic acid. Although the divalent radicals appear to be similar to those in the present invention, the actual repeating structure of the patentees' polymer is clearly different since it contains an aromatic radical designated A. It is not clear from the patentees' discussion whether or not their polymers are thermotropic in nature. Hot melt polymerization procedures such as employed by Laakso and in U.S. Pat. No. 4,182,842 tend to form random poly(esteramides) and not highly regular ones with strict alternation of the amide and ester pairs. The randomness is known to result from two effects: (1) initial placement of radical containing acid and amine groups is random and leads to randomness in the repeating units; (2) even if placed in regular fashion, the high temperature polymerization tends to randomize the system by transesterification and transamidation processes.

SUMMARY OF THE INVENTION

Thermotropic poly(esteramides) exhibiting polymorphic properties and having a symmetrical structure are characterized by the structure

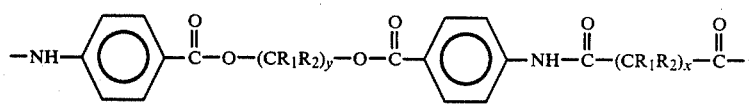

where:
x=integers from 1 to 14
y=integers from 3 to 9
$R_1$, $R_2$=H.
These poly(esteramides) may be prepared by reacting in solution the diester diamine

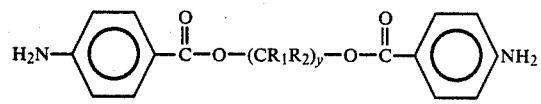

with an aliphatic diacid

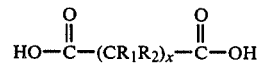

or, alternatively, an aliphatic diacid chloride. Preferably, $R_1$ and $R_2$ are H. The nature of the monomers and the low polymerization temperature insure that the polymers are strictly alternating. Thermotropic polymorphic properties are found with most polymers within the ranges given. However, when x+y is an odd integer, spontaneous flow properties combined with optical birefringence, characteristic of what are often called liquid crystalline polymers, are observed. When x+y is an even integer, birefringence above a major endotherm is seen, as it is when x+y is odd, but the spontaneous flow is often absent. A few exceptions to this odd/even rule are present however.

It is characteristic of the poly(esteramide) according to the invention that they are strictly alternating in structure, and in the preferred embodiments two amide moieties alternate with two ester moieties as the structure given above shows.

DESCRIPTION OF THE PREFERRED EMBODIMENTS

Polymers

Figure 1:
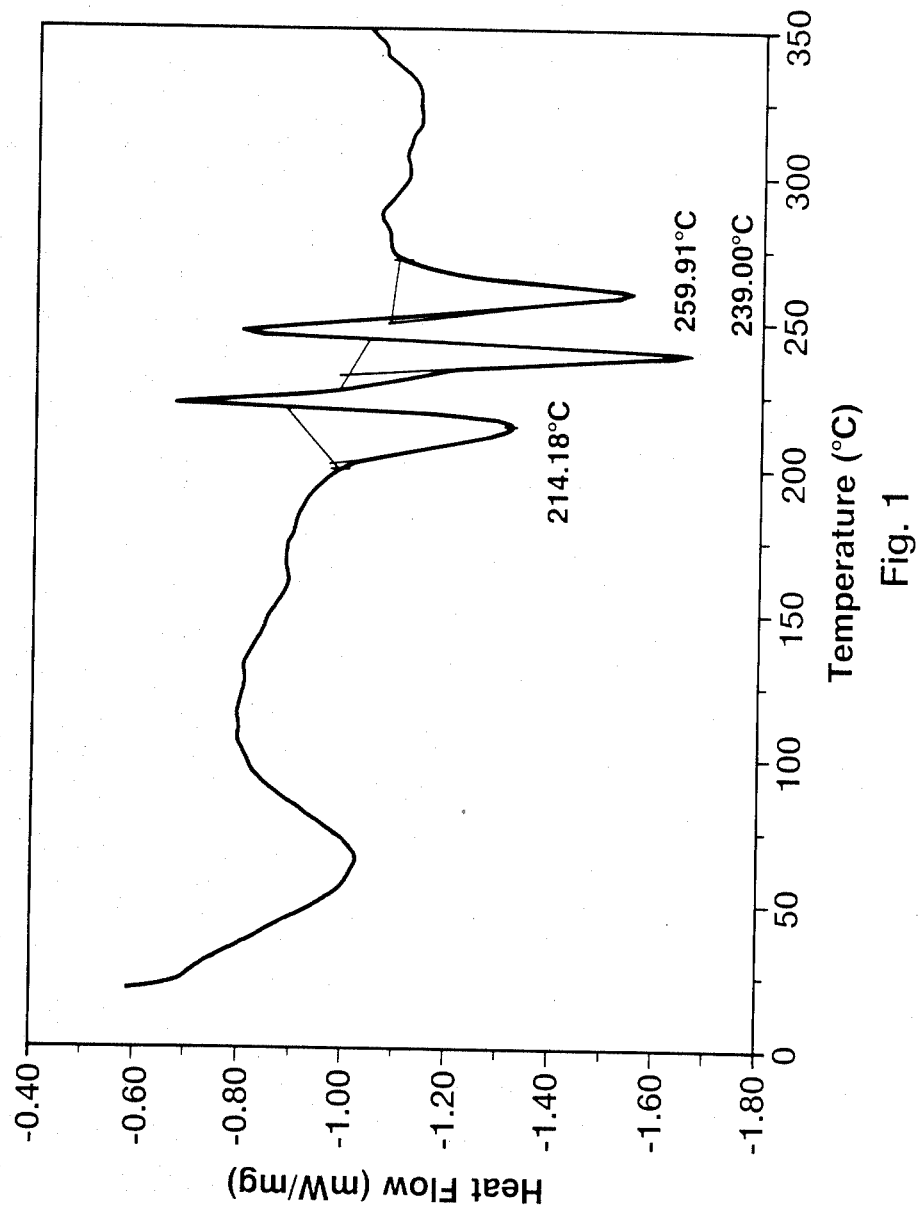
FIG. 1 is a differential scanning calorimeter (DSC) curve for a poly(esteramide) with y=3, x=4.

It has been found that a unique class of poly(esteramides) has thermotropic polymorphic properties. In contrast to the earlier disclosures of poly(esteramides), the polymers of the invention have regularly repeating pattern of ester and amide groups which are balanced between aromatic and aliphatic moieties. Previously, the polyester amides had wholly or predominantly aromatic groups in the backbone, and it was considered that such groups provided the necessary rigidity leading to the ordered structures which have been generally described as liquid crystals. Since in the new polymers substantial aliphatic groups are present, the rigidity previously thought to be needed is not present and consequently it was surprising to find that properties of liquid crystal polymers were found. Interestingly, however, the shortest aliphatic group (when y=2 in the defining formula), which might be expected to provide the most rigid structure, was actually found to exhibit no liquid crystal properties. Longer chains, however, unexpectedly do show such properties but as will be seen, they vary regularly with some showing above their major endotherm both birefringence and spontaneous liquid flow while others show birefringence only.

Liquid crystal, thermotropic, anisotropic, and other terms have been applied to various types of polymer behavior in the temperature region below the clearing point. For purposes of the present invention, the term "thermotropic polymorphic" is being introduced. "Thermotropic" refers to the temperature region below the clearing point where structural changes are found. "Polymorphic" refers to the presence of many ordered structures within the thermotropic region, depending upon the temperature and the history of the polymer. Thus, when the properties of a polymer are referred to as "thermotropic polymorphic" it is to be understood that more than one ordered (crystalline or other) structure has been found in the temperature region below the clearing point. At times, it will be convenient to use the shorter term "properties" where the meaining is clear.

Poly(esteramide) of the invention have a double repeating structure, that is, -amide, -amide -ester -ester -amide -amide -ester -ester-. It has been found that such pairwise strictly alternating structures must be present for thermotropic polymorphic properties to appear. The reason for this is not entirely certain, but it is believed to result from hydrogen bonding between adjacent polymer chains which provides a rigidly otherwise found with chains containing more aromatic rings. As will be seen in Example 10 below, when the strictly alternating pattern is not present, thermotropic polymorphic behavior is absent even though the amide and ester moietiesare the same as in polymers according to the invention.

Thermotropic poly(esteramide) which exhibit polymorphic properties have a strictly alternating symmetrical structure which may be written as follows:

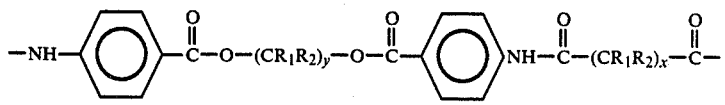

where:
x=integers from 1 to 14
y=integers from 3 to 9
$R_1, R_2 = H$.

It should be noted that the structure of the polymers disclosed by Laakso et al. in Table IV is written in the same manner, but as Example 14 shows the actual structure is not likely to be strictly alternating. Values of x=6-8 and y=4, 6 were reported. However, in Preston's U.S. Pat. No. 3,926,923 the formula is written below columns 1 and 2 with the aliphatic groups x and y reversed.

The formula shown above is for a double repeating structure. That is, amide -amide -ester -ester -amide -amide -ester -ester. This structure is preferred because it is simpler to produce. Laakso et al. reacted a diester with a diol as shown by Preston. The present inventor prefers another method, disclosed by Yamazaki et al. J. Polymer Sci. Polym. Chem. Ed., 13, 1373 (1975). In this procedure, a diester diamine

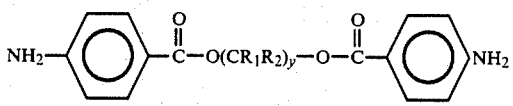

is reacted with an aliphatic diacid

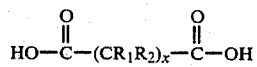

where $R_1$, $R_2$, y, and x are as defined in connection with the polymer. The procedure generally is conducted in solution at around 100° C. and involves the formation of amides from aromatic amines and free acids, in the presence of pyridine and triphenylphosphite. I have found that other aromatic phosphites are also effective. A specific example will be found in Example 1.

The principles found in the double repeating structure suggest that a single repeating structure, that is, -amide -ester -amide -ester, should also exhibit thermotropic polymorphic properties. Such polymers would have the general formula

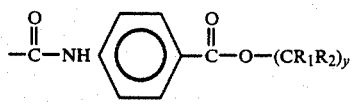

where:
y = integers from 2 to 14
$R_1$, $R_2$ = H.

Such polymers may be made by preparing and polymerizing monomers represented by the formula

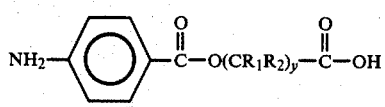

where $R_1$, $R_2$, and y are defined above.

Properties of the Polymers

It is necessary that poly(esteramides) should melt below the point at which the polymer becomes an isotropic melt. This last temperature is commonly referred to as the clearing point. The properties which characterize what are called liquid crystal polymers generally and the thermotropic polymorphic polymers of the present invention are found below the clearing point. The ordered structures observed have led to the "liquid crystal" name being adopted. Points at which the ordered structures appear are determined by a standard heating and cooling apparatus known as a differential scanning calorimeter (DSC). As the temperature of a polymer sample is changed, heat effects are measured which indicate the occurrence of physical changes. The diagrams shown in connection with the examples to follow illustrate that the poly(esteramides) of the present invention typically have several deflection points which indicate that structural changes have occurred.

Another method of detecting the presence of ordered structures in the polymer is the use of cross-polarized light in connection with a microscopic examination of a sample of the polymer. When a uniform amorphous material is observed, the polarized light is fully extinguished, resulting in a uniform black appearance. When ordered structures are present, they are observed as bright areas in the field (birefringence). Such will be seen in connection with the present invention in the examples. It appears that various structures occur depending upon the temperature and history of the polymer sample.

One characteristic typical of liquid crystal polymers has been found with some, but not all, of the new poly(esteramides). At temperatures where an endothermic change occurs and is detected by the scanning calorimeter, a birefringent structure will be detected by observation in the cross-polarized light. At the same time, the material will spontaneously flow even though it is below its clearing point. It is characteristic of the new polymers that they will flow when the x+y is an odd integer. However, when x+y is an even integer, a birefringent ordered structure will be detected, but the material does not flow spontaneously. This distinguishing difference is shown in Example 4 where closely related polymers are shown to have different properties. At present, it is not clear why the properties have a regularity, but it is thought that specific intrachain rotational isomers allow for interchain interactions in one case, and are absent in the other. In the following examples, polymers were prepared and their properties tested under the following conditions.

Diacids were obtained from chemical supply houses and used as received. The diamine esters were prepared in two steps from p-nitrobenzoyl chloride and $HO(CH_2)_y$—OH where y=2, 3, 4, 5, 9. In the first step, the dinitro precursor was prepared by Schotten-Baumann type reaction in a cold mixture of chlorinated solvent and pyridine. After separation, the dinitro compound was dissolved in DMF or DMAC at temperatures from 60° to 120° C. and reduced to the diamine by high pressure hydrogenation in the presence of catalytic amounts of Raney nickel. After workup, the resulting pure diamine was used for polymerization with diacids.

Typically, the monomers are free diacids, such as glutaric acid (x=3) sebacic acid (x=8) or hexadecanedioic acid (x=14), and the diamines contain diesters, such as p-diaminobenzoylpropane (y=3) or p-diaminobenzoylpentane (y=5).

The amount of solvent required in a polycondensation reaction depends on the desired concentration of monomeric species in the reaction mixture. The most often used concentration was approximately 10% monomers. In a typical reaction, 100 mL N,N-dimethyl acetamide (DMAC) and 5.0 g LiCl were mixed in a 300 mL round bottom flask equipped with a stirrer. The mixture was brought up to 100 C. in a thermostatted silicone oil bath and a complete dissolution of the LiCl effected. About 12–15 g of the desired monmer combination was then added, with pyridine, to obtain about 1.2 mol of pyridine per mole of expected amide bonds. Once the monomers had dissolved and the mixture had regained its temperature, 1.1 mol of triphenyl phosphite (TPP) per mole of amide residues was addded. Depending on the molecular weight of the monomers, this procedure resulted in about 10% monomers in the reaction mixture. The reaction time was counted from the moment the mixture that contained the TPP reached 100° C. Reactions were run for as long as 180 minutes, cooled, and dropped into a large excess of methanol. The precipitated product was filtered, washed repeatedly in methanol, and finally dried in a vacuum oven at temperatures of 110°–120° C. No correlation was ever noticed between the drying temperature and thermal transitions subsequently observed by DSC and/or hot-stage cross-polarized light microscopy. The compositions of all polymers were confirmed by carbon-13 NMR spectra. These spectra were obtained with a Varian XL-200 Fourier Transform NMR spectrometer. In most instances, the specimens were studied as moderate concentration solutions in deuteriated DMAC/LiCl.

The intrinsic viscosity [n] of a tested sample is a measure of whether it is polymeric or not. The intrinsic viscosity is the value obtained by extrapolation to the concentration of the reduced viscosities, $n_{sp}/C$, measured as is common in the art at several concentrations in the dilute solution regime. The intrinsic viscosity of monomeric species was measured to be in the range of [n]=0.01–0.03 dl/g, for oligomers $0.03 < [n] < 0.1$ dl/g and for higher molecular weight polymers $[n] \geq 0.15$. In general, the intrinsic viscosity of the polymers in this invention was of the order of 0.5 and higher, indicating moderate to high molecular weights throughout.

The reduced and intrinsic viscosities of all polymers were determined with internal dilution Cannon-Ubbelohde glass viscometers, at 25° C. The solvent most frequently used was a solution of 5 wt/vol % LiCl in reagent grade N,N-dimethylacetamide (DMAC/5% LiCl).

DSC scans were obtained with a du Pont model 9900 differential scanning calorimeter, with the specimens present in nitrogen atmosphere. The heating rates were variable, but most frequently either 10° K./min or 20° K./min. In most instances, a heating cycle was followed by rapid cooling to room temperature and a second heating cycle. The reproducibility of the thermal transitions upon heating was confirmed.

In parallel with the DSC studies, hot-stage cross-polarized light microscopy studies were conducted to determine the presence, or absence, of order in the polymeric specimens during heating and cooling. The existence of order in the specimens is evidenced by the presence of birefringence observed by the cross-polarized light microscope. A random amorphous sample, either glassy or molten, lacks order and, hence, fully extinguishes the passage of light through the cross-polarized optics, resulting in the field of vision being black. In our studies, the cross-polarized light microscope was Olympus BH-2 microscope equipped with camera. For the purpose of rapid scans, a Reichert hot stage was used. For controlled heating and cooling cycles, a Mettler FP-82 hot stage connected to a Mettler FP-80 controller were used. In all instances the sample was placed on the hot stage in between a microscope slide and a cover plate and was squeezed as flat as possible.

EXAMPLE 1

In a 500 ml round bottom flask equipped with magnetic stirrer there were placed 200 ml DMAC and 10 gr LiCl. The mixture was heated to 100° C. with stirring until the LiCl dissolved. Then, 10.0 grams hexadecanedioic acid (0.0349 moles, M.W.=286.42) were added, followed by 10.96 grams diaminobenzoyl propane (0.0349 moles, M.W.=314) (Sold by the Polaroid Corporation under the trade name Polacure 740M). To the resultant solution there were added 5.68 grams pyridine (0.0718 moles, M.W.=79.10) and 21.98 grams triphenylphosphite (TPP) (0.0708 moles, M.W.=310.3). The temperature of the solution was thermostatted at about 105° C. and the reaction allowed to proceed for 3 hours. At this point, the very viscous solution was poured in a thin stream into a large excess of swirling methanol. The polymeric product immediately precipitated. After comminution, the solids were collected by filtration and then washed subsequently in water, water/methanol and methanol to remove all reaction by-products, residual solvent, and LiCl. Then the polymer was dried in a vacuum oven for 16 hours at about 120° C. Its instrinsic viscosity measured to be [n]=0.65 dl/g indicating a high molecular weight polymer. Other polymers were prepared by the same procedure and, in addition to their intrinsic viscosities, the weight average molecular weight, $M_w$, were determined by light scattering techniques. The results are listed in the Table below.

TABLE 1

Polymerization Results for Poly(esteramides) with y = 3 and Variable x

| x = Number of —$CH_2$— Groups in Diacid | [n] dl/g | Mw |
|---|---|---|
| 1 | 0.26 | 11500 |
| 2 | 0.26 | 6800 |
| 3 | 0.57 | 18000 |
| 4 | 0.72 | 52000 |
| 5 | 0.78 | 65000 |
| 6 | 1.07 | 92000 |
| 7 | 1.38 | 137000 |
| 8 | 1.45 | 73000 |
| 10 | 1.86 | 108000 |
| 11 | 0.87 | 37000 |
| 12 | 1.02 | 62000 |

Analogous polymers with y=2, y=4, y=5 and y=9 and various x values were prepared from the corresponding diacids and diaminobenzoyl ethane, diaminobenzoyl butane, diaminobenzoylpentane and diaminobenzoyl nonane, respectively.

Model compounds were prepared by the use of the same procedure, but one of the reacting ingredients, or both, was a monovalent radical, while both reacting species in the preparation of the polymers are divalent radicals.

EXAMPLE 2

All polymers were studied by both hot-stage cross-polarized light microscopy and DSC. The lowest transition observable by microscopy is an abrupt onset of sample softening. At lower temperatures, the sample does not easily deform and recoils when pressure is applied to it while on the microscope hot-stage. Above this temperature, the sample loses its rigidity and its ability to recoil, and even low pressures are sufficient to squeeze the sample between the microscope slide and cover glass. On occasion, a small endotherm appeared in the DSC scan at a temperature corresponding to this softening temperature. Above the softening point, most polymers with y=3, 4, 5 and 9 developed substantial birefringence indicating the development of ordered structures in the system. This birefringence was, as a rule, absent in the polymers below the softening point during the first heating cycle. Above the softening point, several major endotherms and exotherms appear in the DSC scans. The lowest major endotherm, signifying a loss of order, is usually invisible under the microscope. Similarly, the lowest major exotherm, signifying that some structurization takes place, is not accompanied by any substantial and reproduceable change in the morphology observed by microscopy. At temperatures higher than the lowest major exotherm, there appears in poly(esteramides) with $y \geq 3$ either one additional major endotherm, or a cycle of endotherm, followed by exotherm followed by one more major endotherm. A graphic description of this is shown in FIG. 1, the first heating cycle of a poly(esteramide) with $y=3$ and $x=4$.

Figure 2:
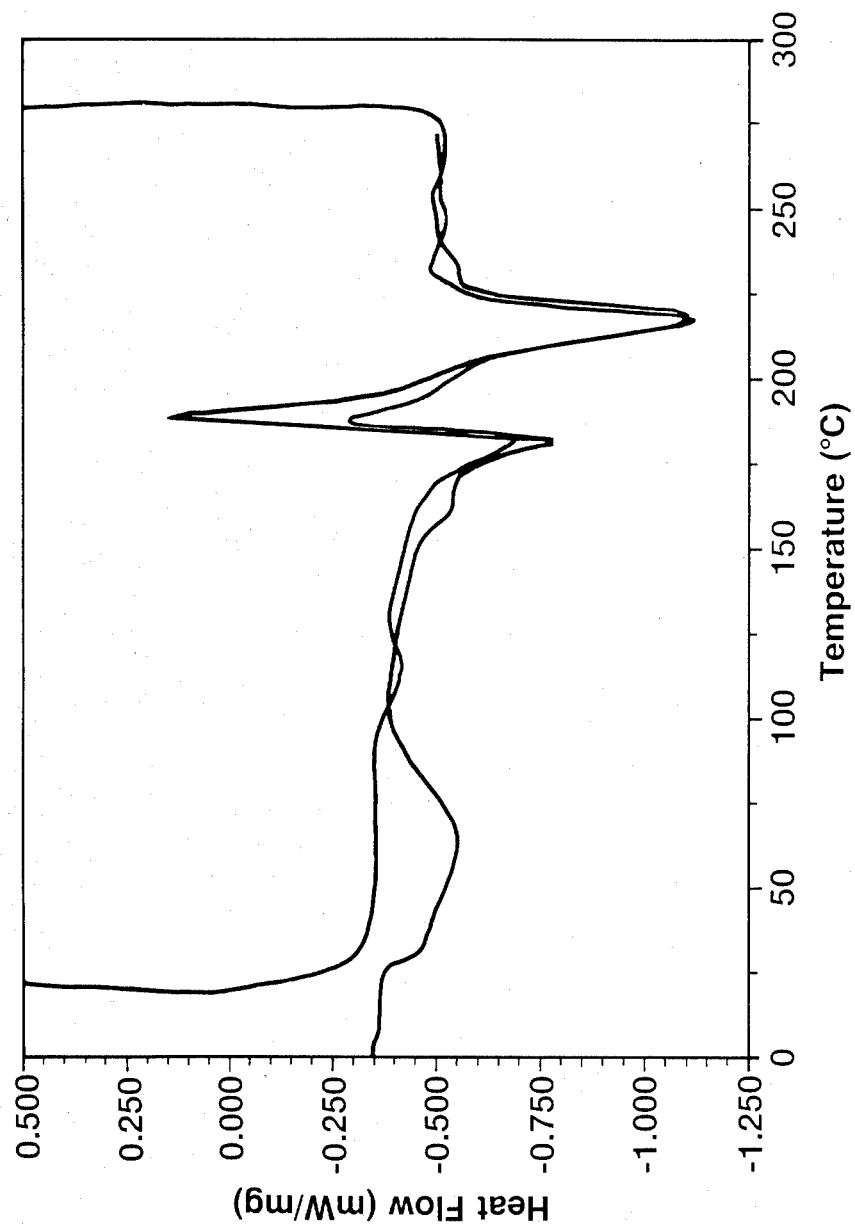
FIG. 2 is a DSC curve for a poly(esteramide) with y=3, x=8.

In FIG. 2 are shown two heating cycles of a poly(esteramide) with $y=3$ and $x=8$. Notice the reproducibility of the major transitions in the range of 175° C. to 225° C. In the temperature interval above the uppermost major endotherm (about 220° C.), there appear several small exotherms indicating the existence of some ordered structures. These minor exotherms are rather reproducible and reappear in the second heat cycle and in subsequent cycles not shown in this figure. The reproducibility of these minor exotherms clearly improves with an increase in the chain length between adjacent amide group, i.e., an increase in x.

Figure 3:
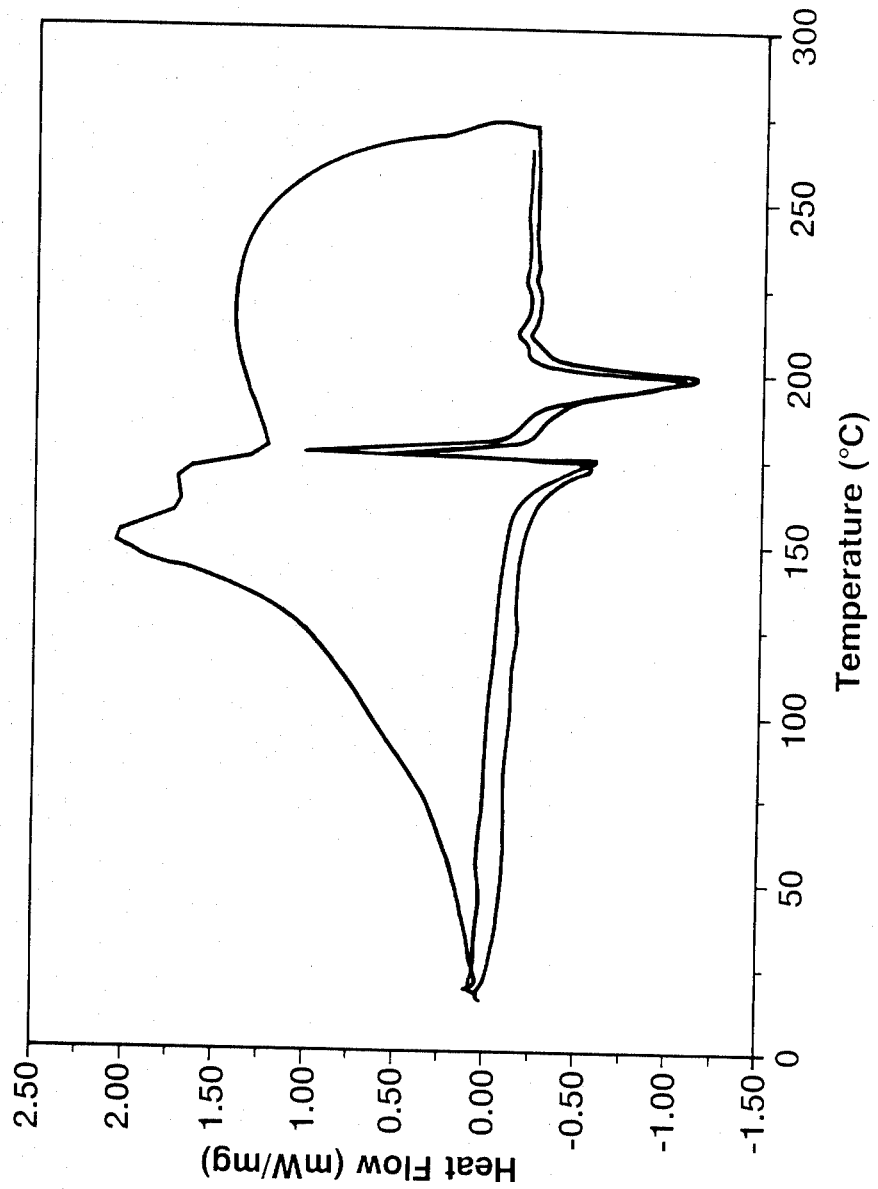
FIG. 3 is a DSC curve for a poly(esteramide) with y=3, x=14.

In FIG. 3, a complete sequence of heating, cooling, and reheating is shown for a poly(esteramide), with $y=3$, $x=14$. It is obvious that in the two heating cycles both the major and the minor endotherms and exotherms are reproduced remarkably well. In the cooling cycle, an abrupt ordering takes place at a temperature identical with the one in which a major ordering takes place upon heating. This lack of supercooling upon ordering during a cooling cycle is considered to be typical of liquid crystalline transitions.

Figure 4:
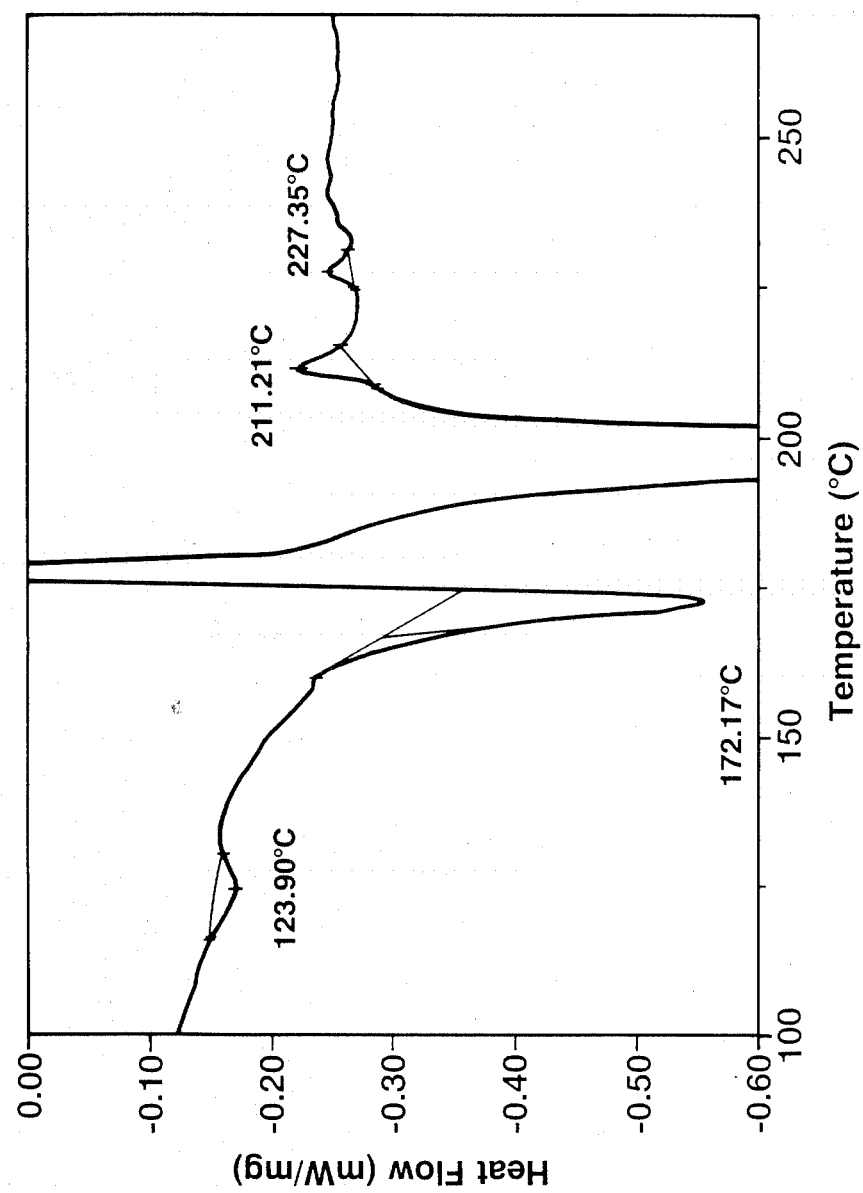
FIG. 4 is a DSC curve for a poly(esteramide) with y=3, x=14.

In FIG. 4, a magnified portion of the first heating cycle from FIG. 3 is shown. The small transition at about 124° C. corresponds to the softening temperature observed by microscopy. Above the uppermost major endotherm (about 195° C.), at least two small exotherms are visible.

In all cases where such small exotherms were observed by DSC studies, intense birefringence of the soft poly(esteramide) developed. This birefringence became very noticeable at the uppermost major endotherm or closer to the first small exotherm above it. The birefringence persisted through all the small transitions and finally faded away at a temperature above the uppermost small transition. With few exceptions in the case of poly(esteramides) with $y \geq 3$, when $x+y=2n+1$ (odd), then at least part of the temperature interval where intense birefringence was visible was characterized by a spontaneous flow of the birefringent polymer in between the glass slides on the hot stage of the cross-polarized light microscope. When $x+y=2n$ (even), the birefringent poly(esteramide) did not flow spontaneously but could be easily made to flow by a light touch to the microscope cover glass.

Figure 5:
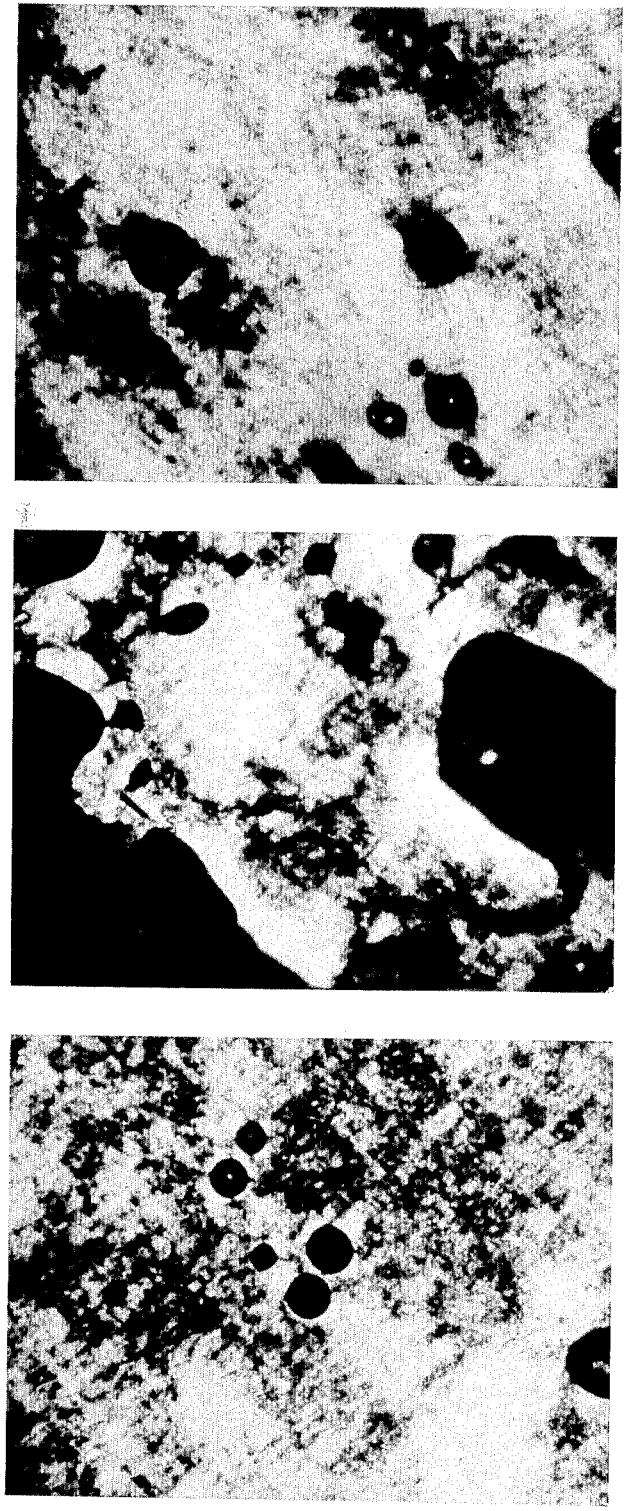
FIG. 5 is a series of photographs of a poly(esteramide) with y=3, x=8.

In FIG. 5 are shown three cross-polarized light photomicrographs taken from a polymer with $y=3$, $x=8$ at 230° C., above the uppermost major endotherm. In the photographs, the white areas are the ordered, birefringent, flowing poly(esteramide). The dark round inclusions are air bubbles developing or entrained in the molten polymer.

Figure 6:
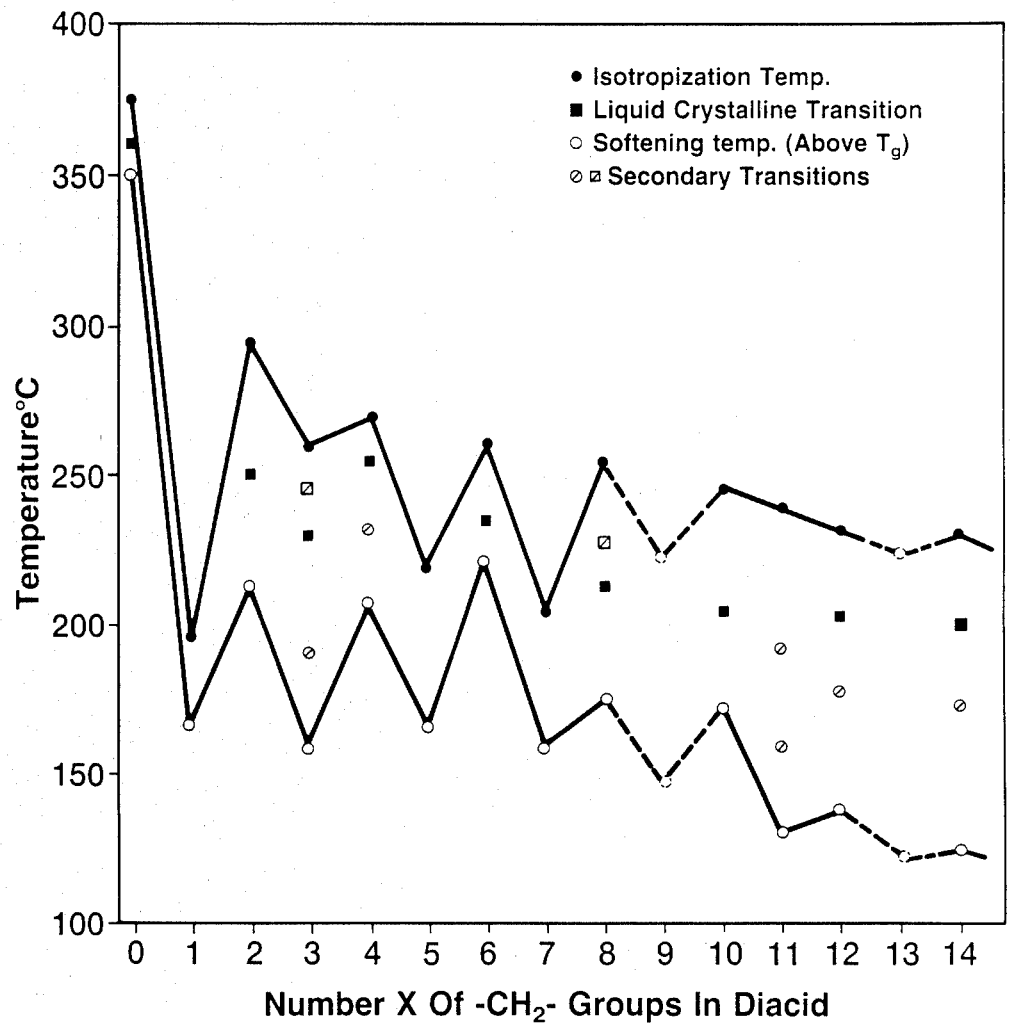
FIG. 6 is a plot of transition temperatures vs. the value of x where y=3.

In FIG. 6, a phase diagram of all members of the poly(esteramide) family with $y=3$ is shown. The plot indicates the transition temperatures of each polymer as a function of x, the number of —CH$_2$— groups in between the adjacent amide groups. The lowermost "saw teeth" curve connects all the "softening temperatures" of this family. As is common in liquid crystalline substances, there exists a strong odd-even effect. The uppermost curve connects all the temperatures at which the last vestiges of birefringence faded away on the microscope's hot stage. The solid squares in between represents the points at which spontaneous flow of the birefringent polymer was observed. Other transitions, usually major endotherms or exotherms, are also indicated.

EXAMPLE 3

Figure 7:
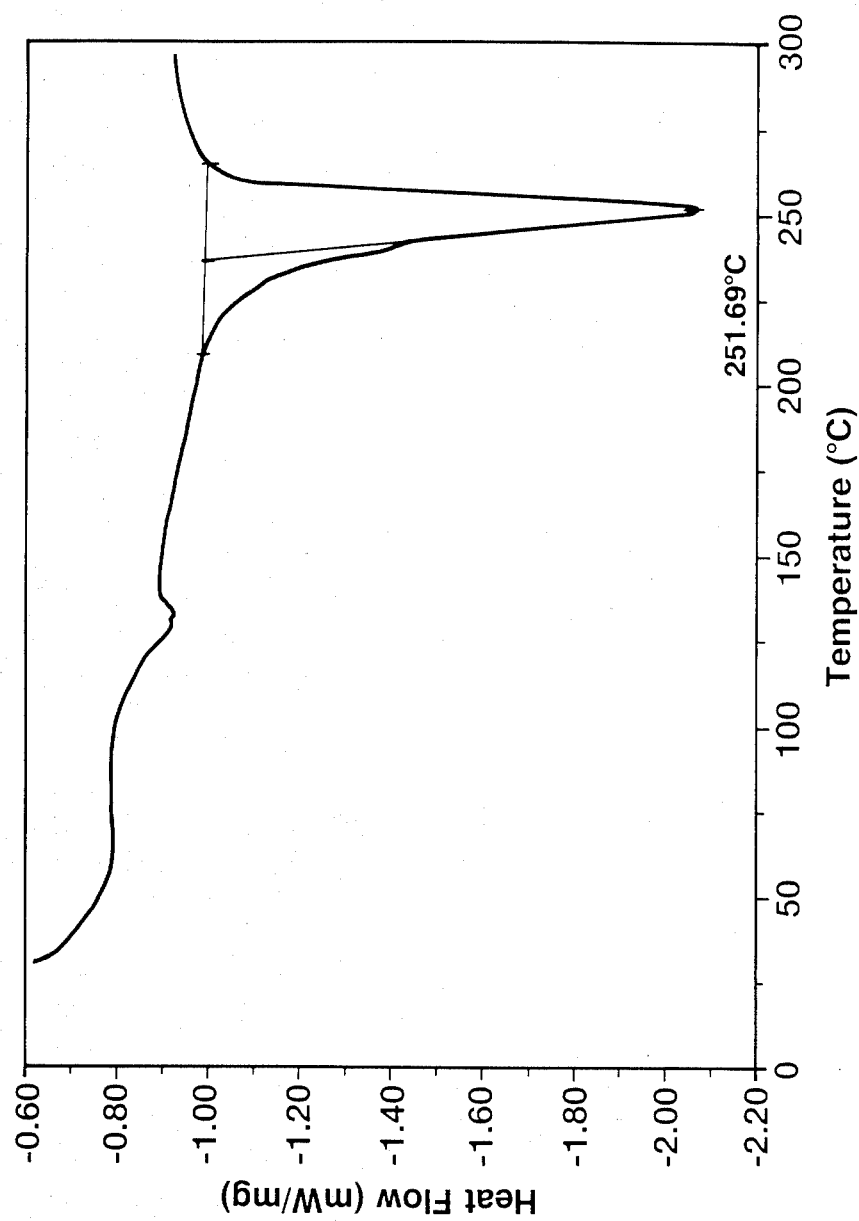
FIG. 7 is a DSC curve for a poly(esteramide) with y=4, x=6.
Figure 8:
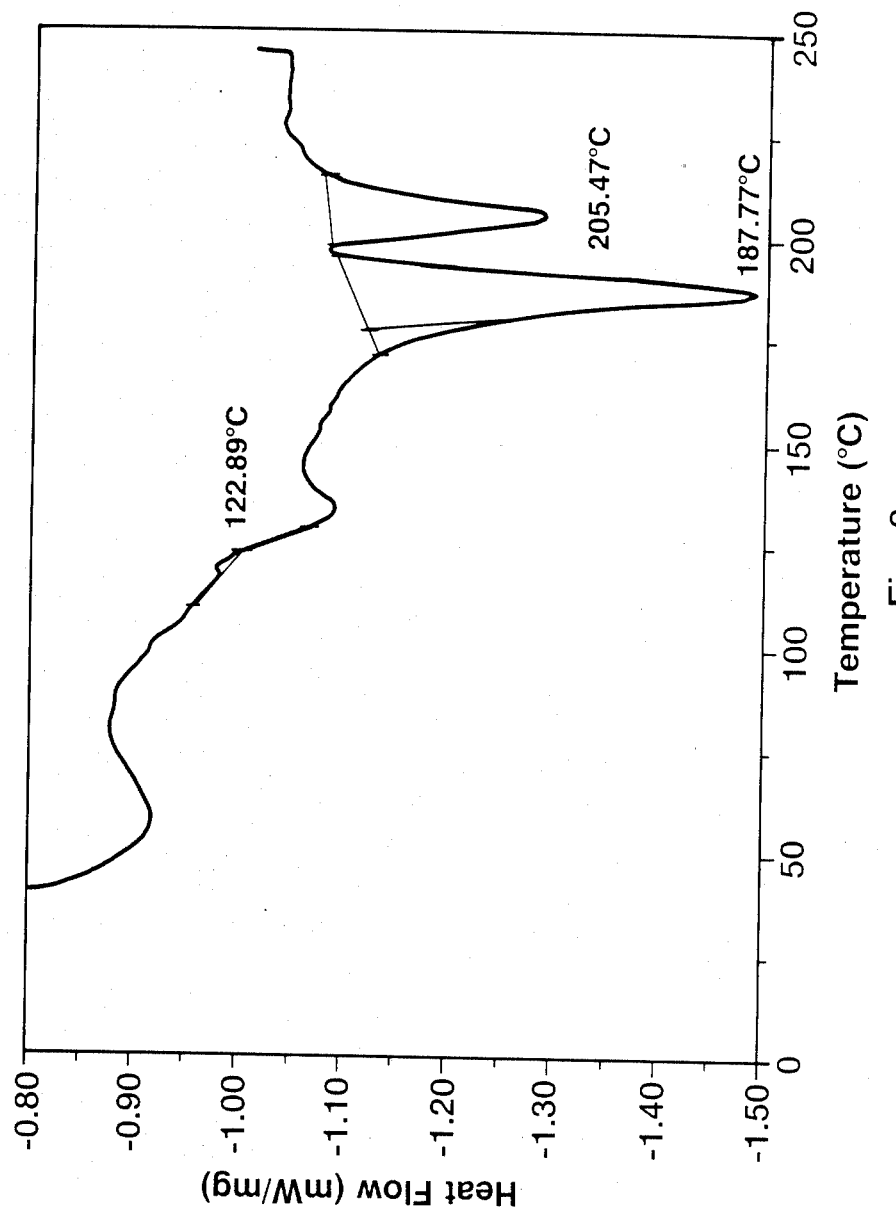
FIG. 8 is a DSC curve for a poly(esteramide) with y=4, x=7.
Figure 9:
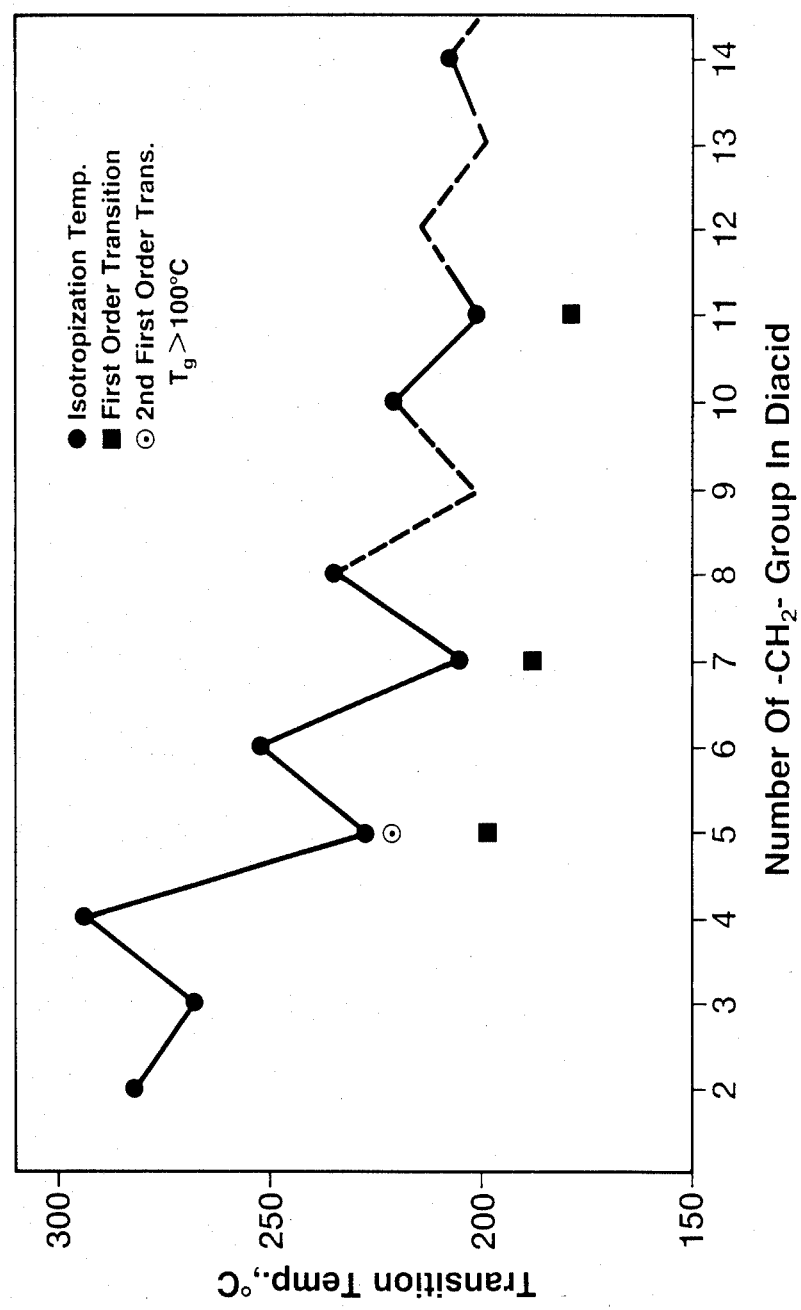
FIG. 9 is a plot of transition temperatures vs. the value of x where y=4.
Figure 10A:
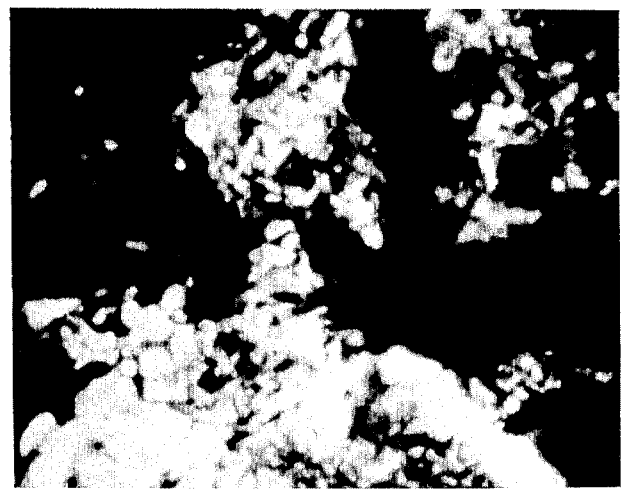
FIGS. 10A and B is a series of photographs of a poly(esteramide) with y=5, x=14.
Figure 10B:
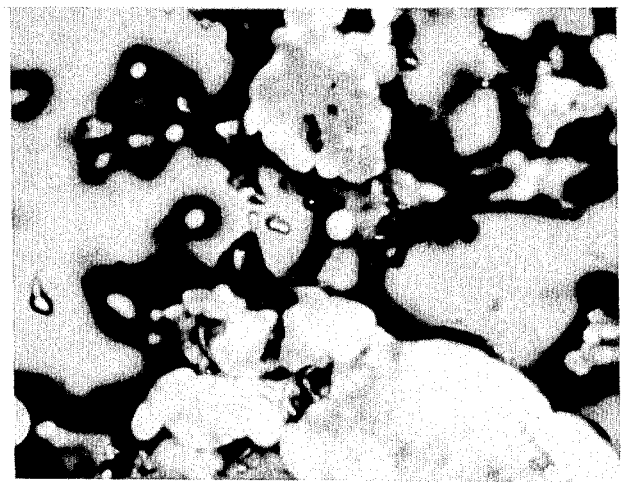
Figure 10C:
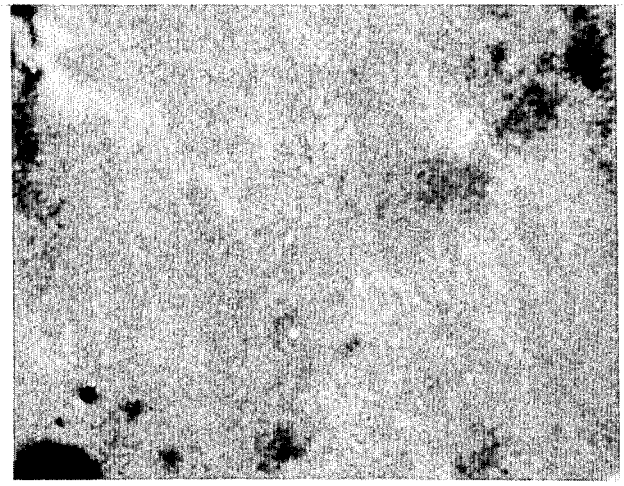
Figure 10D:
Figure 10E:
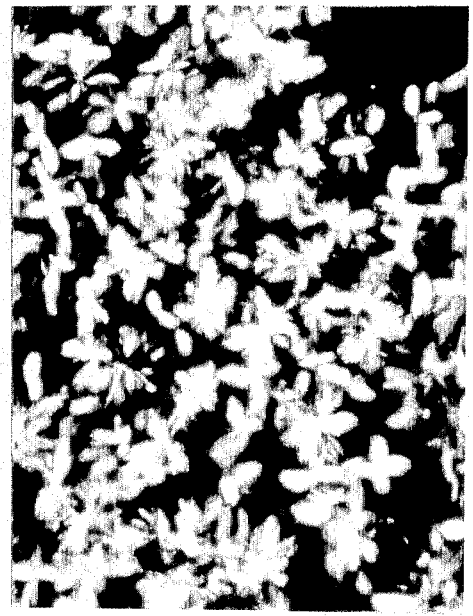
Figure 10F:
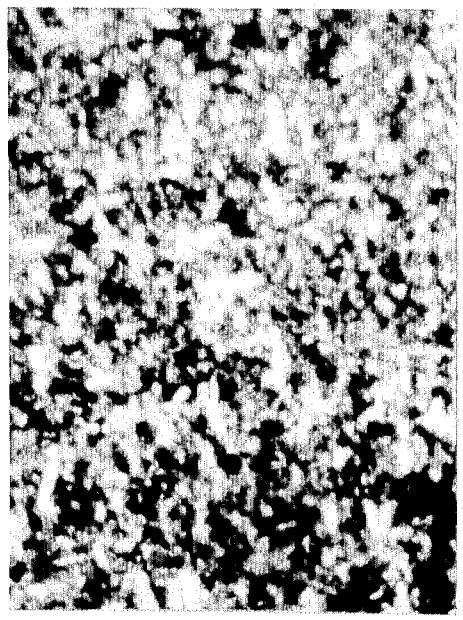
Figure 10G:
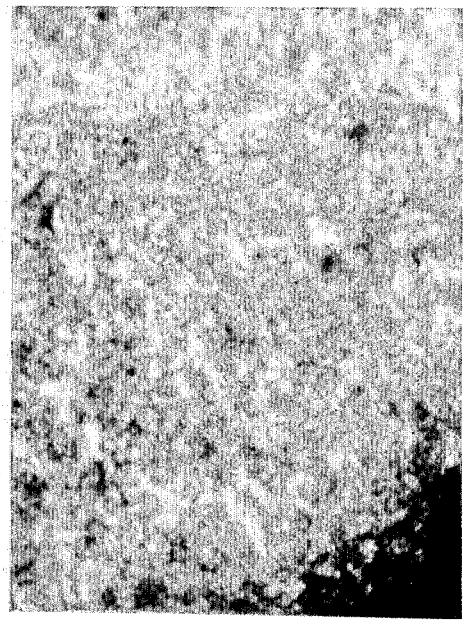

Polymers with $y=4$ and x varying from 2 to 14 (except for $x=9$, 12, 13) were prepared from diaminobenzoyl butane and the appropriate diacid in a fashion identical to Example 1 and the description of the preferred embodiment above. They were tested by means of DSC scans and hot-stage cross-polarized light microscopy, as decribed in detail in Example 2 above. With one exception, polymers with $y=4$ exhibited intense birefringence together with spontaneous flow when $x+y=2n+1$, and no birefringence when $x+y=2n$. In this case, polymers with $x+y=2n$ showed only one major endotherm and no other transitions. This endotherm is typical of simple crystal melting. FIG. 7 ($y=4$, $x=6$) is typical of such a behavior. The poly(esteramides) with $x+y=2n+1$ showed two major endotherms and essentially no exotherm in between them. Such behavior is shown in FIG. 8 for a poly(esteramide) with $y=4$, $x=7$. The cross-polarized light microscopy revealed a birefringent flowing liquid crystalline behavior in the temperature interval between the two endotherms. A phase diagram of all available members of the family with $y=4$ is presented in FIG. 9. Here the curve connects all points where the polymer turned to isotropic melt. The temperatures at which the polymers with $x=$odd and $y=4$ started showing birefringence coupled together with spontaneous flow are indicated by solid squares.

EXAMPLE 4

Polymers with $y=5$ and x varying from 3 to 14 (with the exception of $x=9$, $y=13$ were prepared from diaminobenzoylpentane and the appropriate diacid in the manner indicated in Examples 1 and 3 above. The diamine was prepared in two steps from p-nitrobenzoyl chloride and n-pentanediol. The polymers were studied by means of DSC scans and hot-stage cross-polarized light microscopy, as described in Example 2. In this case, all tested polymers with $x+y=2n+1$ showed liquid crystalline behavior, that is combined spontaneous flow and intense birefringence, in the first heating cycle. Then DSC scans showed two or more intense endotherms, followed by several minor endotherms at higher temperature. The onset of liquid crystalline corresponded to the temperature of the upper large endotherm. A state of fully isotropic melt was reacted only above the uppermost minor endotherm. The presence of the minor exotherms is more obvious in the cases of large x than when x is small. Also, the slower heating and cooling cycles in the DSC instrument gave time for the structures in the system to "ripen" and made the small transitions more pronounced. With a heating and cooling rate of 10° K./min and slower, the transitions upon heating are all reproducible, both major and minor ones.

In FIG. 10, we follow the behavior of a poly(esteramide) with $y=5$, $x=14$ as observed upon heating and cooling in the hot-stage cross-polarized light microscope. Photo "A" shows the intense birefringence as it exists above the "sotening point" but below the temperature where spontaneous flow occur. In photo "B", the flowing birefringent mass is seen in the lower part of the micrograph. Photograph "C" shows the dull birefringent fluid existing upon heating in the temperature interval above the upper major endotherms and below the clearing (isotropization) temperature. In photograph "D", birefringent structures (initially appearing as batonnets) develop upon cooling from the isotropic melt. The temperature whose birefringent ordered structures appear is substantially higher than the uppermost major endotherm. Photo "E" shows the growth of these structures upon annealing at elevated temperatures; photograph "F" shows the actual phase change upon cooling at a temperature identical to the major exotherm observed upon heating, and photograph "G" shows the crystalline state of the polymer existing from the phase transition down to room temperature. A second heating and cooling cycle repeats all the above.

Figure 11:
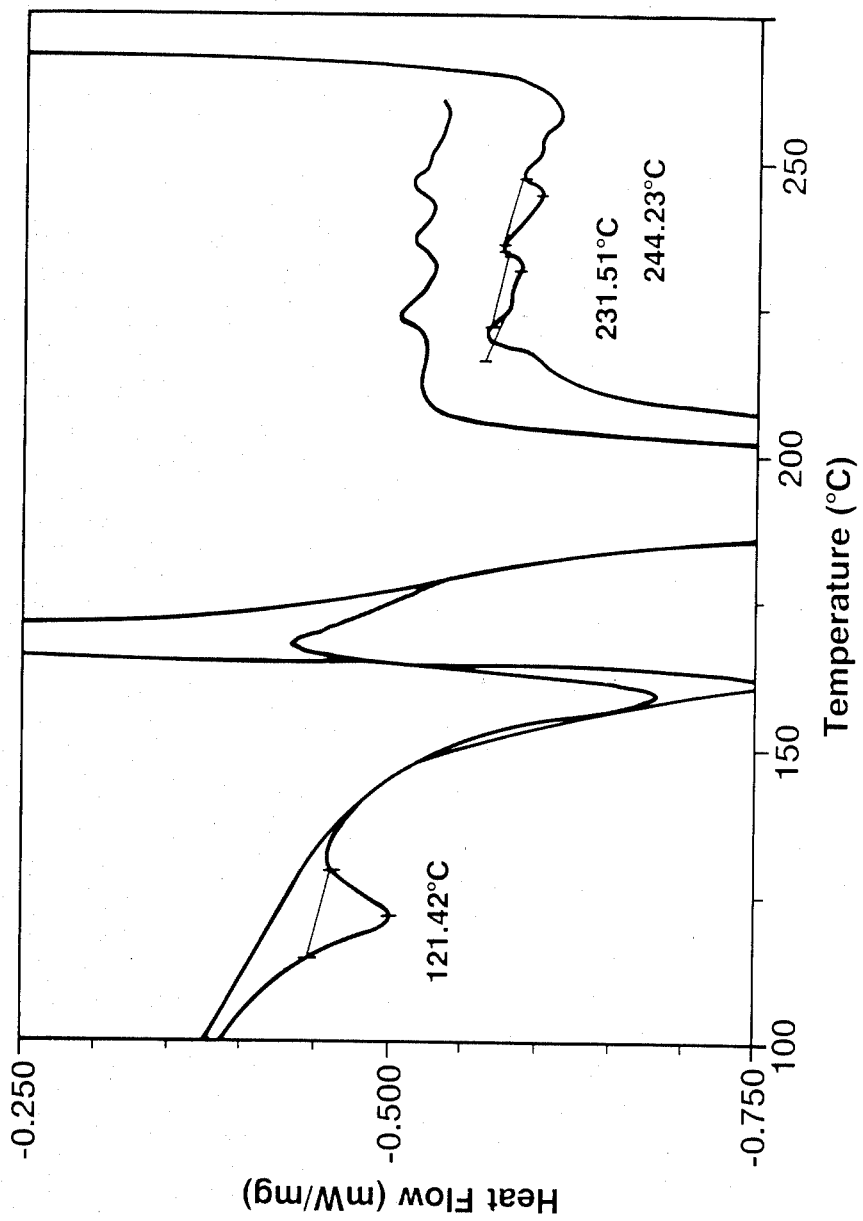
FIG. 11 is a DSC curve for a poly(esteramide) with y=5, x=14.

In FIG. 11, a magnified portion of a DSC scan of poly(esteramide) $y=5$, $x=14$, clearly shows the reproducibility of the thermal transitions. Two major endotherms and three small ones are seen, an excellent example of a thermotropic mesomorphic polymer, changing its morphology several times upon heating.

Figure 12:
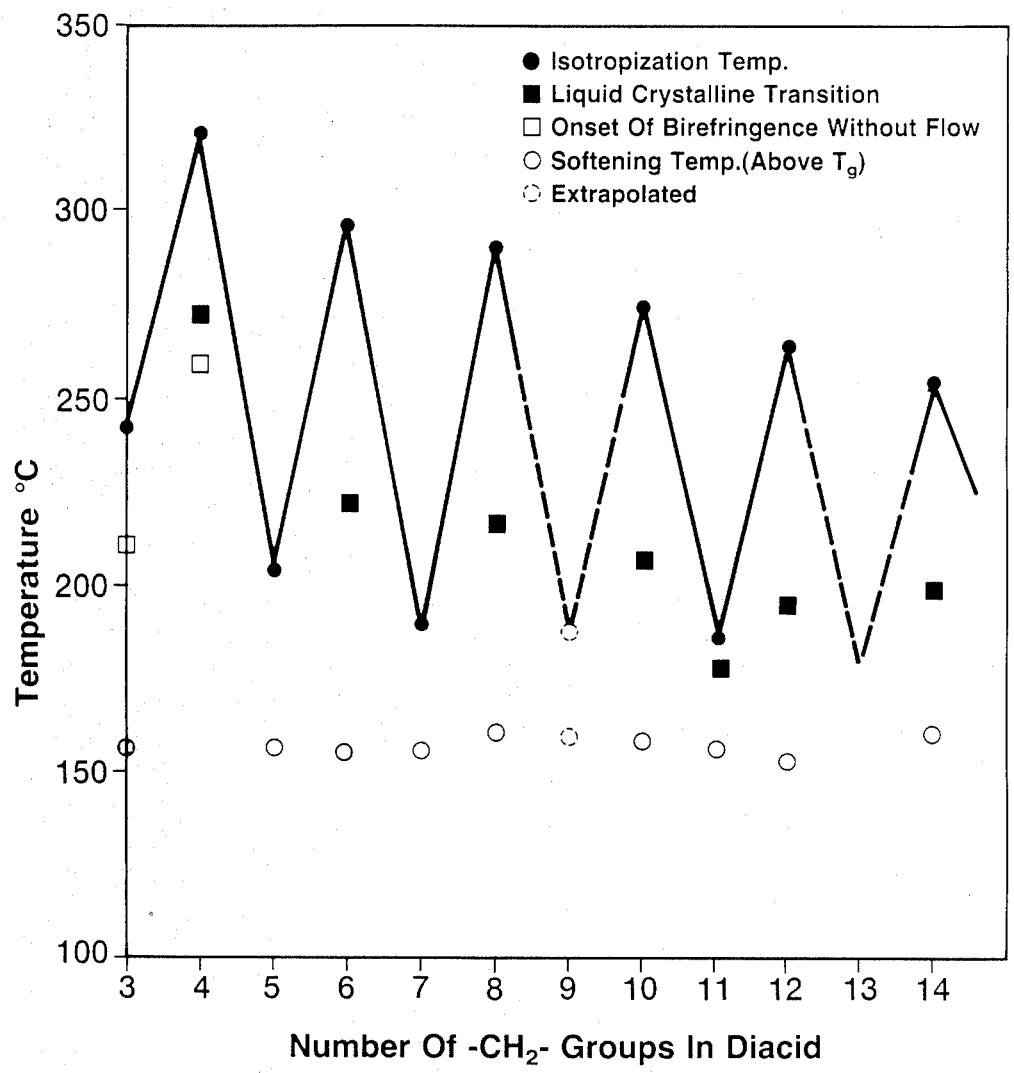
FIG. 12 is a plot of transition temperatures vs. the value of x where y=5.

In FIG. 12, a phase diagram of the poly(esteramide) family with $y=5$ is shown. All polymers with $x+y=2n+1$ are liquid crystalline. The polymers with $x+y=2n$ show intense birefringence upon heating but not spontaneous flow, except for the polymer with $x=11$ that does show the birefringent spontaneous flow typifying liquid crystallinity.

EXAMPLE 5

Polymers in which $y=9$ and $y=3, 4, 7, 8, 11, 12$, and 14 were prepared according to the procedures of Example 1 from the appropriate diacids and diaminobenzoylnonane which had been prepared in two steps from p-nitrobenzoyl chloride and nonanediol. DSC and hot-stage cross-polarized light microscopy indicated liquid crystallinity when $y=9$, $x=7$ and possibly $y=9$, $x=4$. This, together with the fact that liquid crystallinity was not observed in other members of the family, indicate that the odd-even effect is not adhered to in this family as in the cases were y was smaller.

Figure 13:
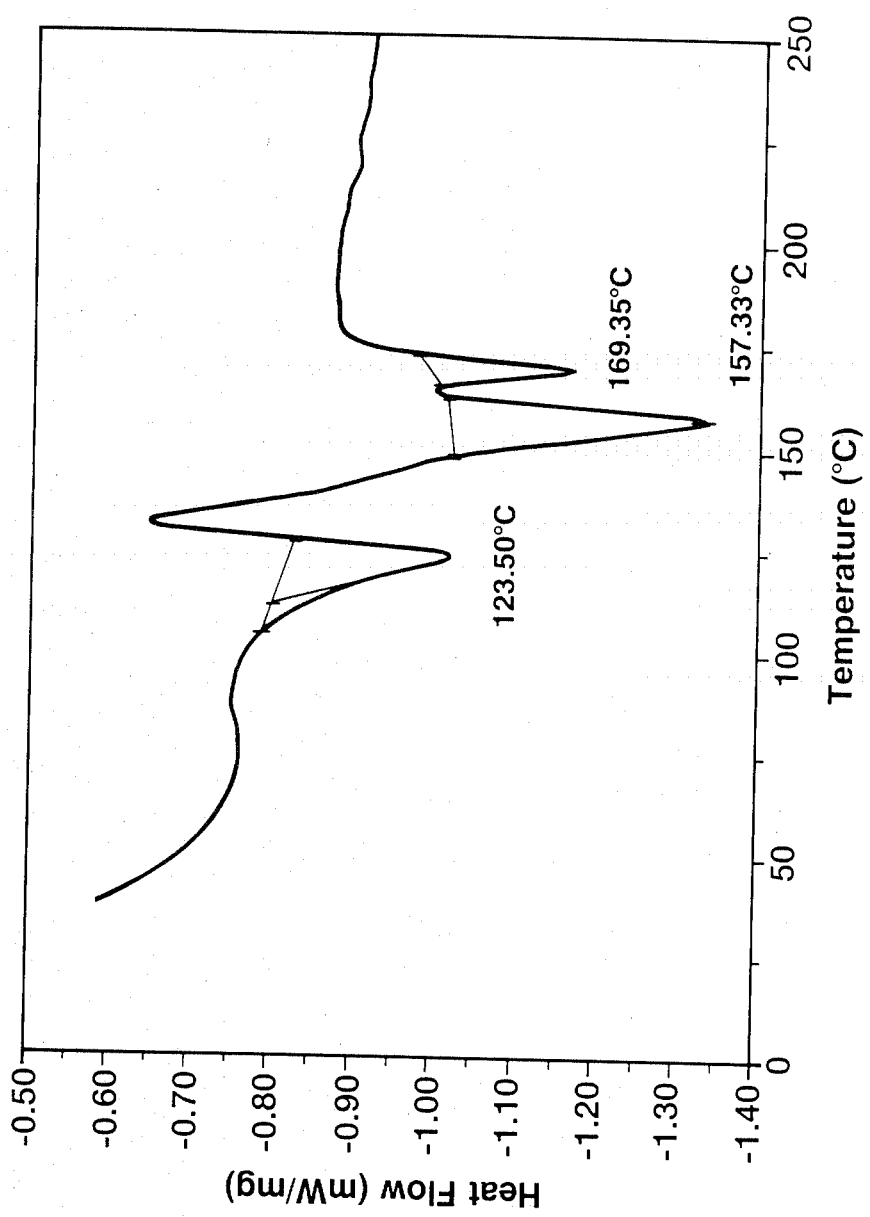
FIG. 13 is a DSC curve for a poly(esteramide) with y=9, x=7.
Figure 14:
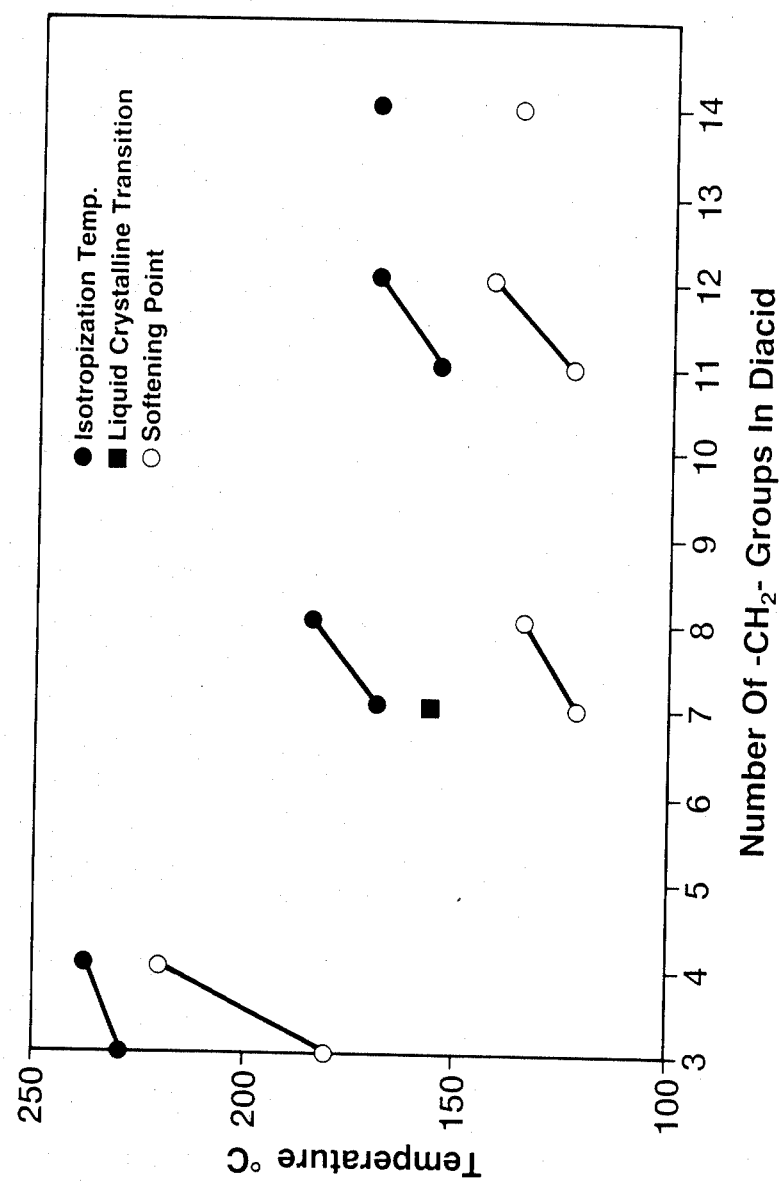
FIG. 14 is a plot of transition temperatures vs. the value of x where y=9.

FIG. 13 is a DSC scan of a polymer where $y=9$, $x=7$. The liquid crystalline state was evident in the small temperature interval between the endotherms at 157° C. and 169° C. In FIG. 14, a phase diagram is shown for all members of the $y=9$ family that were synthesized.

EXAMPLE 6

(Comparative)

Figure 15:
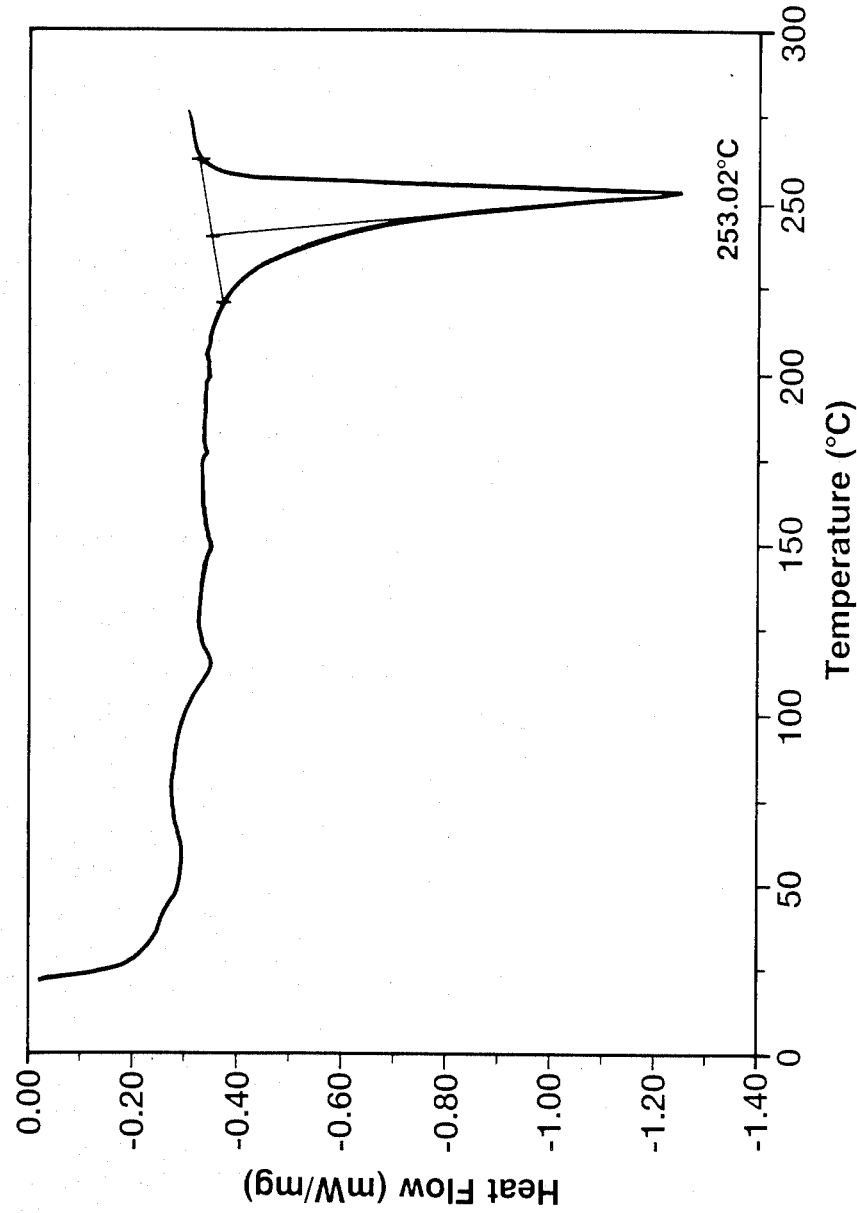
FIG. 15 is a DSC curve for a poly(esteramide) with y=2, x=14.
Figure 16:
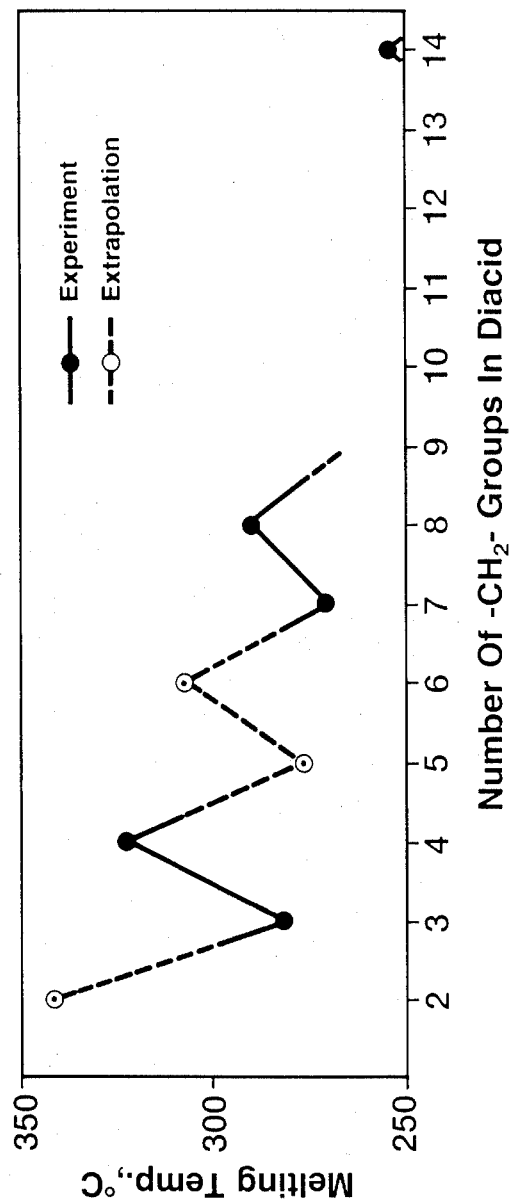
FIG. 16 is a plot of transition temperatures vs. the value of x where y=2.

Poly(esteramides) where $y=2$, $x=3, 4, 7, 8, 14$ were polymerized from the respective diacids and diaminobenzoyl ethane which was prepared as described in the description of the preferred embodiments. They all showed a single sharp endotherm upon heating. Hot-stage cross-polarized light microscopy confirmed that this transition is a normal melting point of a crystalline polymer to an isotropic melt. No ordered structures appeared in the cooling melt above an abrupt crystallization point. A typical DSC scan is shown in FIG. 15 for polymer(esteramide) with $y=2$ and $x=14$. A phase diagram of the family is shown in FIG. 16.

EXAMPLE 7

(Comparative)

Monomeric model compounds were prepared according to the procedure in Example 1 from one equimolar amount of diaminobenzoyl propane and 2 equimolar amounts of aliphatic linear monoacids. These acids were chosen such that they each contained besides the carboxyl group $x=5, 6, 8$ and 9 carbon atoms. The general structure of the model compounds is, therefore,

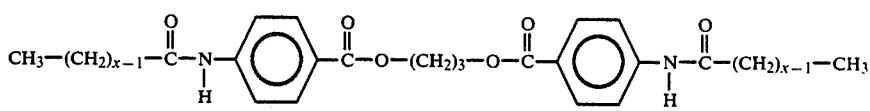

Figure 17:
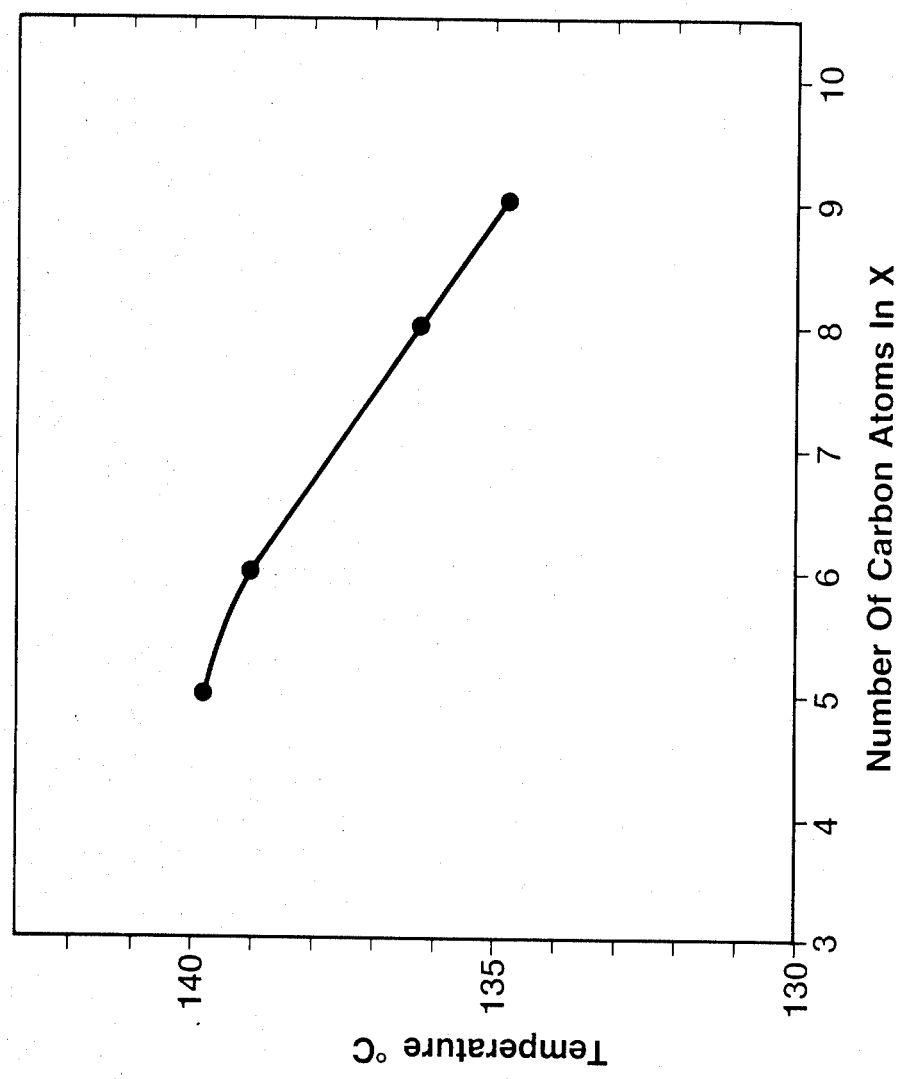
FIG. 17 is a plot of the melting points of model compounds.

All the model compounds showed a single melting point by DSC and hot-stage microscopy, and no evidence of liquid crystallinity. A transition map of the model compounds is presented in FIG. 17.

EXAMPLE 8

(Comparative)

Four model compounds of the general formula

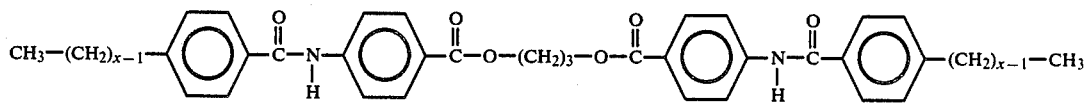

were prepared from diaminobenzoyl propane and p-alkylbenzoic acid. The length of the alkyl chain corresponds to $x=5, 6, 7, 8$.

Figure 18:
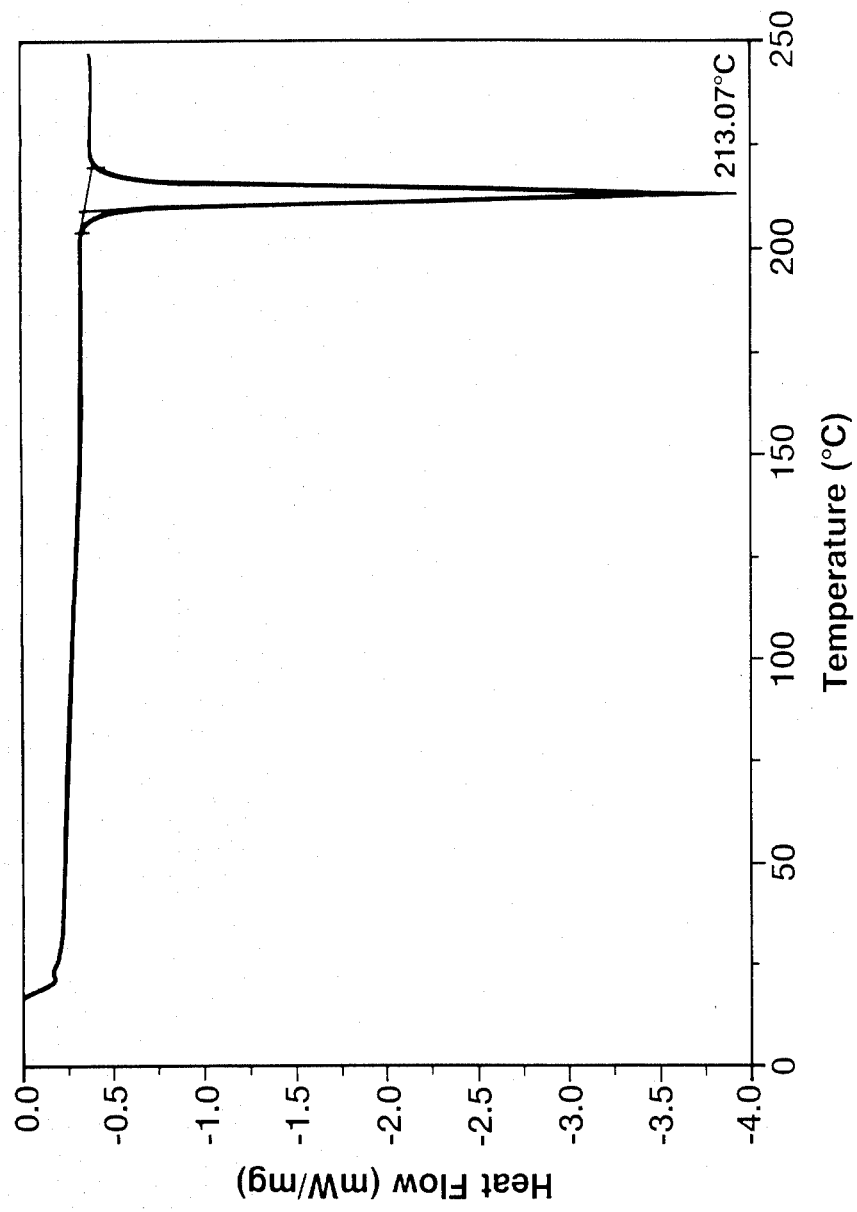
FIG. 18 is a DSC curve for a model compound where y=3 and the acid is 4-pentyl benzoic acid.

The model compounds melted at the temperatures 213° C., 205° C., 195° C. and 184° C., respectively. No liquid crystallinity was observed. A typical DSC scan is shown in FIG. 18, for compound with $x=5$.

EXAMPLE 9

(Comparative)

Poly(ether amide)polymers were prepared in which the monomer bis(aminophenoxy)alkane replaces the bis(aminobenzoyl)alkane used for poly(esteramides). The bis(aminophenoxy)alkane was prepared in two steps. In the first step, following Strzellecki & Van Luyen, Europ. Polymer J. 16, 299 (1980), 4-acetamidophenol is reacted with linear $\alpha,107$-dibromoalkane under mild basic conditions. Then the reaction product is hydrolyzed using the procedure of Bartulin et al. Polymer Bull. 15, 405 (1986), to produce the desired monomer

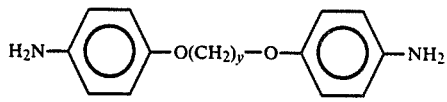

Neither of two monomers having $y=3, 8$ showed any liquid crystalline behavior.

Figure 19:
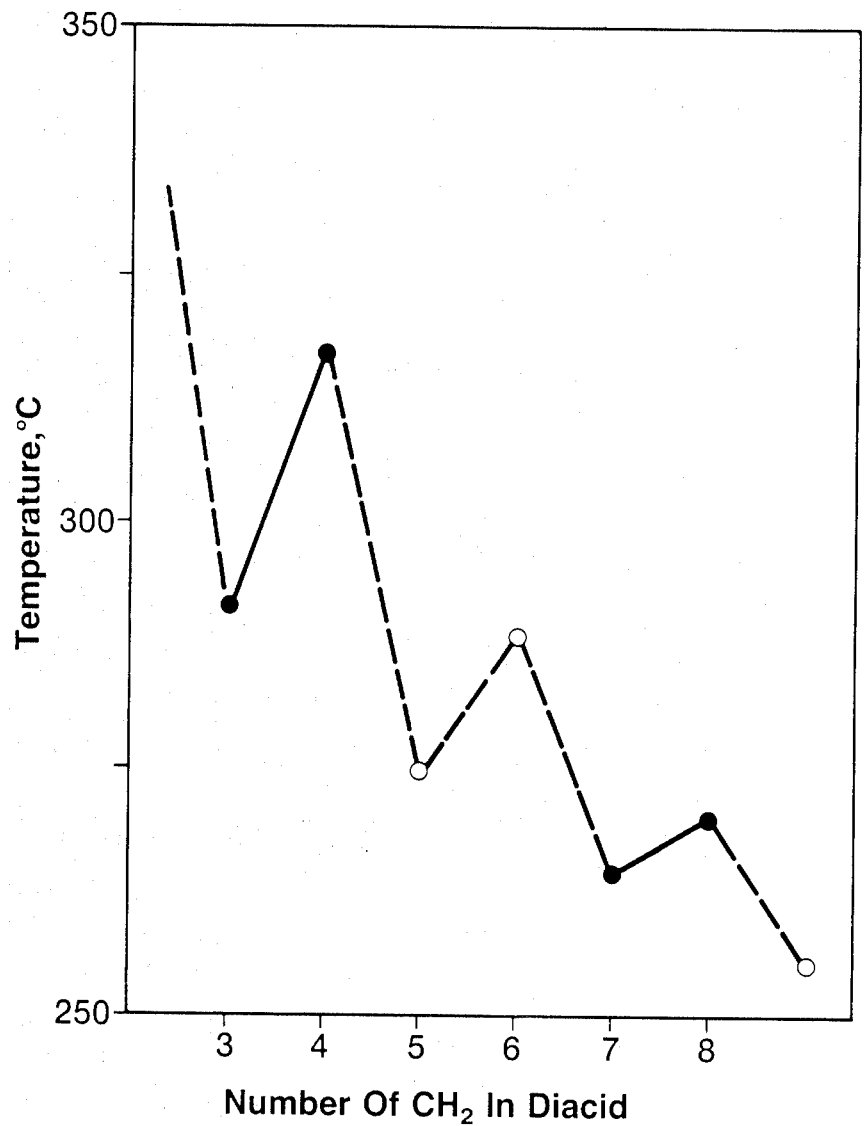
FIG. 19 is a plot of the melting points of poly(ether amides).

Following the procedure in the description of the preferred embodiments and Example 1, the monomer bis(aminophenoxy)propane was polymerized with several aliphatic linear diacids to produce poly(ether amides) with y=3 and x=3, 4, 7, 8. Tests described in Example 2 indicate that none of these polymers showed liquid crystallinity. In FIG. 19, the melting points of the poly(ether amides) are plotted against x. The dashed lines represent extrapolations to expected melting temperatures. The odd-even effect is clearly visible in the melting points even though no liquid crystallinity is evident.

No liquid crystallinity was observed in poly(ether amides) with y=6, x=7, and y=8 x=3, and y=8 x=4.

EXAMPLE 10

(Comparative)

Non-uniform placements of ester and amide groups were obtained by two methods:

(a) Non-uniform distances between two ester groups or two amide groups or between all four such groups were obtained by using mixtures of two diacids of different lengths (various x) with one diamine, two diamines of different lengths (various y) with one diacid, and two diacids and two diamines all of different lengths. All the above compositions were prepared. The resulting poly(esteramides) each exhibited a single endotherm in its DSC scans and each simply melted from a semicrystalline solid to an isotropic melt. No liquid crystallinity was observed. Table 2 below lists all the polymers prepared in order to verify that mixtures of x, mixtures of y or mixtures of both x and y prevent the appearance of thermotropic liquid crystallinity. In the case when a mixture of diacids or diamines was used, they were mixed in a equimolar amounts. None of the poly(esteramides) in Table 2 exhibited thermotropic liquid crystallinity.

TABLE 2

| No. of —CH$_2$ Groups in Diamine (y) | No. of —CH$_2$ Groups in Diacid (x) | Highest Endotherm, T C |
| --- | --- | --- |
| 3 | 3 + 4 | 178 |
| 3 | 7 + 6 | 147 |
| 3 | 7 + 8 | 152 |
| 3 | 3 + 7 | 167 |
| 3 | 5 + 7 | 190 |
| 3 | 8 + 4 | 172 |
| 3 | 8 + 10 | 186 |
| 3 + 4 | 10 | 203 |
| 2 + 4 | 10 | 233 |
| 3 + 4 | 7 + 10 | 139 |
| 2 + 4 | 7 + 10 | 196 |

(b) Non-uniform sequencing (i.e., not strictly alternating) coupled with non-uniform distances between the ester and amide groups are afforded by mixing three monomers: diamine, diacid, and aminoacid. In this case, a poly(esteramide) comprising of equimolar amounts of diaminobenzoyl propane, suberic acid and ω-aminocaproic acid produced a high molecular weight ([n]=1.72 dl/g) polymer characterized by a small melting point at 178° C. in the first heating cycle, and no melting point but a well defined glass transition at 125° C. in the second heating cycle. This indicates the material to be only slightly crystalline when precipitated from the polymerization mixture and remains amorphous upon cooling from the melt. No liquid crystallinity or tendency to become ordered were observed in the heating and cooling cycles.

EXAMPLE 11

(Comparative)

To investigate the effects of chain rigidity on the ability of poly(esteramides) to show thermotropic polymorphicity, several poly(esteramides) were prepared from diaminobenzoyl propane and aliphatic or aromatic diacids which are more rigid than their linear aliphatic analogs. None of the comparative polymers in this example showed thermotropic polymorphicity.

By analogy to the thermotropic polymorphic poly(esteramide) with y=3, x=4 from Example 3, the following poly(esteramides) were prepared and tested. None showed liquid crystallinity.

| Diamine | Diacid |
| --- | --- |
| diaminobenzoyl propane | trans, trans-muconic acid |
| diaminobenzoyl propane | trans-1,4-cyclohexanedicarboxylic acid |
| diaminobenzoyl propane | 3-methyladipic acid (racemic) |
| diaminobenzoyl propane | hydromuconic acid |
| diaminobenzoyl propane | 2,6-Naphthalene dicarboxylic acid |
| diaminobenzoyl propane | terephthalic acid |
| diaminobenzoyl propane | isophthalic acid |

By analogy to the thermotropic polymorphic poly(esteramide) with y=3, x=3 from Example 3, the following poly(esteramides) were prepared and tested. None showed signs of thermotropic polymorphicity.

| Diamine | Diacid |
| --- | --- |
| diaminobenzoyl propane | 3-methyl glutaric acid |
| diaminobenzoyl propane | 2-methyl glutaric acid |
| diaminobenzoyl propane | 2,2-dimethyl glutaric acid |
| diaminobenzoyl propane | 3,3-dimethyl glutaric acid |
| diaminobenzoyl propane | diglycolic acid |

By analogy to the thermotropic polymorphic poly(esteramide) with y=3, x=3 from Example 3, the following poly(esteramides) were prepared and tested. None was liquid crystalline.

| Diamine | Diacid |
| --- | --- |
| diaminobenzoyl propane | maleic acid (cis) |
| diaminobenzoyl propane | fumaric acid (trans) |

EXAMPLE 12

(Comparative)

The polyamide

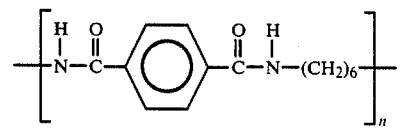

known commercially as nylon 6T is similar to the thermotropic polymorphic poly(esteramides) of this invention, but it does not exhibit any mesomorphic tendencies. Other polyamides were prepared and none showed any thermotropic mesomorphicity. The structures of these are given below:

| Structure | Monomers |
|---|---|
| 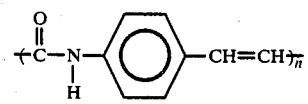 | 4-amino cinnamic acid |
| 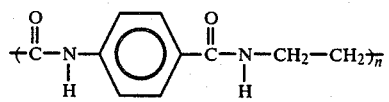 | N—(p-aminobenzoyl) β-alanine |
| 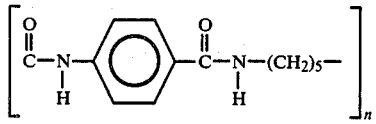 | N—(p-aminobenzoyl)-6-aminocaproic acid |
| 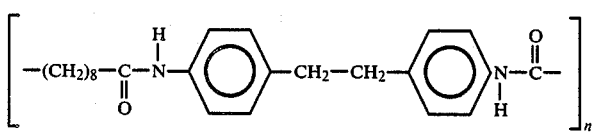 | sebacic acid and ethylene dianiline |
| 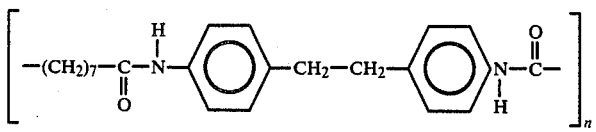 | azelaic acid and ethylene dianiline |
| 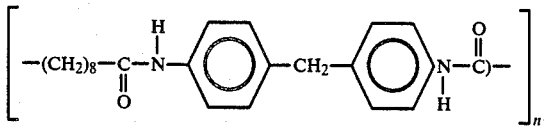 | sebacic acid and methylene dianiline |
| 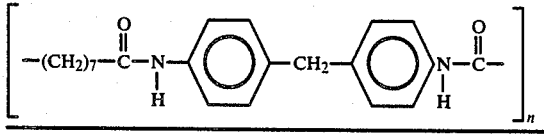 | azelaic acid and methylene dianiline |

EXAMPLE 13

(Comparative)

Polyesters with structures similar to the thermotropic mesomorphic poly(esteramides) of the invention are polyesters such as poly(ethylene terephthalate), poly(trimethylene terephthalate), poly(tetramethylene terephthalate), poly(hexamethylene terephthalate), etc. They are all well known in the literature and none shows thermotropic polymorphicity.

It is known that condensation polymerizations carried out in the molten state or in solution at elevated temperature (200° C. or above) the molecular species are in a state of mobile interchange or equilibrium with end groups reacting with functional groups in the polymer chain (see P. W. Morgan, *Condensation Polymers: By Interfacial and Solution Methods*, Interscience, New York, 1965, p. 6–7). In addition to the randomization of functional groups along the chain brought about by the interchange reactions, such reactions can affect the molecular weights of the reacting species (see F. W. Billmeyer, Jr., *Textbook of Polymer Science*, Interscience, New York, 1962, p. 251). P. J. Flory's *Principles of Polymer Chemistry*, Cornell University Press, Ithaca, N.Y., 1953, pp. 87–91, shows that the interchange reactions include both transesterification and transamidation. Reactions of ester groups with free amine or hydroxyl groups are expected to produce an amide or a different ester, and reactions of amide groups with free carboxylic acid and hydroxyl groups are expected to produce a new amide group and an ester group. In a high temperature melt and in the presence of catalysts promoting transesterification such reactions are known to be relatively rapid. Therefore, it appears that Laakso et al. produced a polymer having a random structure and not the regular one written down in their publication and in Preston's patent.

EXAMPLE 14

(Comparative)

The method of Laakso et al. does not produce polymers having the properties of those of the present invention as previously mentioned. Their procedures were repeated as follows. In the first step, the monomer

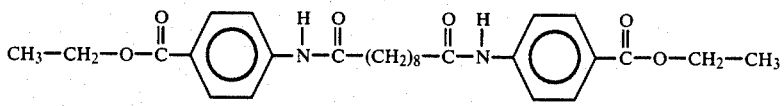

was prepared by the Schotten-Baumann procedure from sebacoyl chloride and ethyl p-aminobenzoate. The melting point was found to be 183.8° C., and thus in agreement with Laakso et al. (181°–183° C.). The monomer was condensed with 1,5 pentanediol in the presence of catalytic amounts of Zn/Sb ions at elevated temperature (1 hr at 240° C.). Ethanol byproduct was removed by distillation and then the temperature was raised to 260° C. and a high vacuum applied for 3 hours. A high molecular weight tough and horny polymer was recovered. The polymer should correspond to y=5, x=8 but when studied by DSC and hot-stage cross-polarized light microscopy did not show the properties of the polymers of the invention. The poly(esteramide) was amorphous and became soft at about 160° C. and began flowing under the pressure at about 170° C., with spontaneous flow being observed above 250° C. The amorphous nature of the polymer reflects randomness in the chain in contrast to the regularity provided by the procedures used by the present inventor.

EXAMPLE 15

In contrast with the Laakso et al. procedure of Example 14, lower temperature polymerization can maintain ordered alternation of the reactive groups along the chain. A poly(esteramide) with y=3, x=8 was synthesized using the Schotten-Baumann procedure from 4,4'-diaminobenzoyl propane and sebacoyl chloride in the presence of pyridine. N,N-dimethyl acetamide was found to be a convenient solvent. The polymerization was carried out at 25° C. for 3 hours. The polymer was precipitated in methane, filtered, washed, and dried as described in Example 1. A DSC scan of the polymer showed three major endotherms which were reproducible upon reheating. The hot-stage cross-polarized light microscope showed the onset of spontaneous flow and intense birefringence midway (ca. 225° C.) between the middle and uppermost major endotherms. Higher fluidity associated with uniform dull birefringence started at 235° C. Birefringence faded completely at about 258° C. Upon cooling from the isotropic melt, ordered structures appear at temperatures as high as 230° C., several degrees above the uppermost major endotherm. The behavior observed was essentially the same as that observed with the poly(esteramide) with y=3, x=8 prepared by the Yamazaki procedure in Example 1.

It is concluded that strict alternation of the ester and amide units is important if the thermotropic polymorphic properties characteristic of polymers of the invention are to be obtained. This may be obtained by the relatively low temperature reaction demonstrated in Examples 1, 2, 4, and 15. The high temperature melt polymerization of Laakso et al. randomizes the polymer and renders it incapable of showing the desired liquid crystalline properties.

EXAMPLE 16

Two polymers were prepared in which x=20. One was prepared by the Yamazaki procedure from docosanedioic acid and diaminobenzoyl pentane (i.e., y=5, x=20). The second was prepared from docosanedioic acid and diaminobenzoyl propane (Polacure) (i.e., y=3, x=20). The polymers were finished as in Example 1 and then studied by DSC and hot-stage cross polarized light microscopy. The polymer with y=5, x=20 had two major endotherms in its initial heating cycle followed by very small transition at higher temperatures. This polymer clearly showed a spontaneous flow accompanied by intense birefringence appearing at the peak of the uppermost major endotherm (169° C.). This birefringence disappeared at 188° C., but a dull grainy birefringence appeared at about 200° C. and remained up to about 228° C. Upon cooling, ordered structures appeared at temperatures higher than either of the two major endotherms. Cooling to room temperature and reheating produced only one major endotherm and no liquid crystalline behavior. It was concluded that the polymer with y=5, x=20 was only marginal in its ability to exhibit thermotropic polymorphicity.

The polymer with y=3, x=20 had only one endotherm with DSC scan and the microscope indicated that transition was a common melting point of a semi-crystalline polymer into an isotropic melt. Slow cooling generates structures in the melt above the endotherm, which upon reheating melt at a higher temperature than in the initial heating. These results indicate that the polymer is morphologically unstable as prepared. No liquid crystalline behavior was observed. Since the poly(esteramide) with y=3, x=20 from this example and with y=9, x=14 from Example 5 showed no liquid crystallinity and the polymer with y=5, x=20 showed only marginal behavior, it is believed that when x is greater than 20 that liquid crystallinity will be absent regardless of the value of the y and that as y increased from 5 to 9 the maximum value of x will decrease from 20 to 14.

I claim:

1. Thermotropic polymorphic poly(esteramides) characterized by the repeating structure

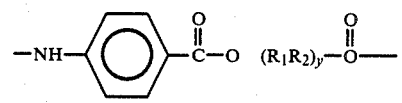

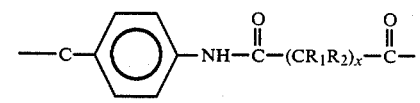

where:
x=integers from 1 to 14
y=integers from 3 to 9
$R_1$, $R_2$=H.

2. The poly(esteramide) of claim 1 wherein x+y is an odd integer.

3. The poly(esteramide) of claim 1 wherein x+y is an even integer.

4. The poly(esteramide) of claim 1 prepared by reacting the diester diamine

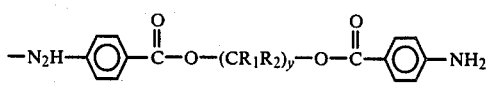

with an aliphatic diacid

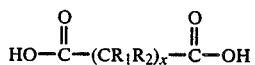

5. The poly(esteramide) of claim 1 wherein $R_1$ and $R_2$ are both H.

6. The poly(esteramide) of claim 1 prepared by reacting a diester diamine with an aliphatic diacid in solution and in the presence of pyridine and aromatic phosphites.

7. The poly(esteramide) of claim 6 wherein said reaction is carried out at a temperature of about 100° C.

8. The poly(esteramide) of claim 6 wherein about 1.1 mols of triphenyl phosphite per mol of amide residues is present during the reaction.

9. The poly(esteramide) of claim 6 wherein about 1.2 mols of pyridine per mol of amide bonds is present during the reaction.

10. The poly(esteramide) of claim 1 prepared by reacting a diester diamine with an aliphatic diacid chloride in solution in the presence of pyridine.

* * * * *

UNITED STATES PATENT AND TRADEMARK OFFICE
CERTIFICATE OF CORRECTION

PATENT NO. : 4,767,839
DATED : August 30, 1988
INVENTOR(S) : S. Aharoni

Page 1 of 2

It is certified that error appears in the above-identified patent and that said Letters Patent are hereby corrected as shown below:

Title page:

In the Abstract:

Line 3, delete

"  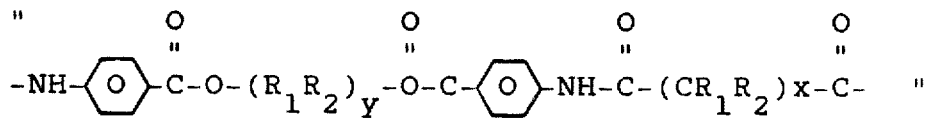  "

substitute therefor --

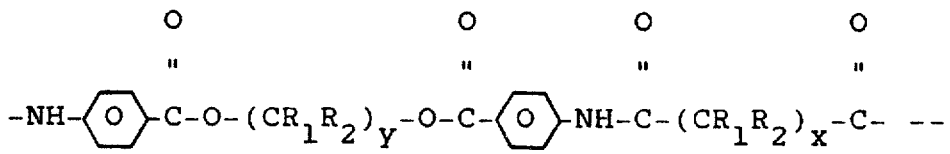 --

UNITED STATES PATENT AND TRADEMARK OFFICE
CERTIFICATE OF CORRECTION

PATENT NO. : 4,767,839
DATED : August 30, 1988
INVENTOR(S) : S. Aharoni

It is certified that error appears in the above-identified patent and that said Letters Patent are hereby corrected as shown below:

In the Claims:

Claim 1, line 5, delete

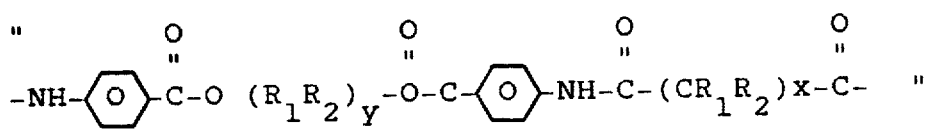

substitute therefor --

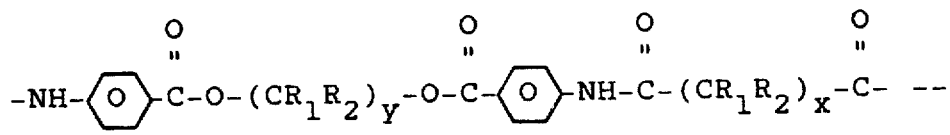

Signed and Sealed this

Twenty-first Day of February, 1989

Attest:

DONALD J. QUIGG

Attesting Officer    Commissioner of Patents and Trademarks